United States Patent
Kaneda

(10) Patent No.: US 9,620,760 B2
(45) Date of Patent: Apr. 11, 2017

(54) POROUS MEMBRANE FOR SECONDARY BATTERIES, METHOD FOR PRODUCING SAME, ELECTRODE FOR SECONDARY BATTERIES, SEPARATOR FOR SECONDARY BATTERIES, AND SECONDARY BATTERY

(71) Applicant: ZEON CORPORATION, Tokyo (JP)

(72) Inventor: Takuya Kaneda, Kanagawa (JP)

(73) Assignee: ZEON CORPORATION, Tokyo (JP)

( * ) Notice: Subject to any disclaimer, the term of this patent is extended or adjusted under 35 U.S.C. 154(b) by 372 days.

(21) Appl. No.: 14/383,938

(22) PCT Filed: Mar. 21, 2013

(86) PCT No.: PCT/JP2013/058023
§ 371 (c)(1),
(2) Date: Sep. 9, 2014

(87) PCT Pub. No.: WO2013/146515
PCT Pub. Date: Oct. 3, 2013

(65) Prior Publication Data
US 2015/0072213 A1   Mar. 12, 2015

(30) Foreign Application Priority Data

Mar. 28, 2012 (JP) .................. 2012-074234

(51) Int. Cl.
*H01M 2/16* (2006.01)
(52) U.S. Cl.
CPC ....... *H01M 2/1686* (2013.01); *H01M 2/1653* (2013.01); *H01M 2/1673* (2013.01)
(58) Field of Classification Search
CPC ............. H01M 2/1686; H01M 2/1653
USPC ....................................................... 429/144
See application file for complete search history.

(56) References Cited

U.S. PATENT DOCUMENTS

2007/0202404 A1   8/2007  Ohata et al.
2007/0264577 A1*  11/2007 Katayama ............ H01M 2/162
                                                          429/246
2011/0229768 A1   9/2011  Pan et al.
2012/0189897 A1   7/2012  Wakizaka et al.
2012/0189898 A1   7/2012  Wakizaka et al.

FOREIGN PATENT DOCUMENTS

| CN | 101434708 A | 5/2009 |
| JP | H01-267950 A | 10/1989 |
| JP | 2006-182925 A | 7/2006 |
| JP | 2011-023186 A | 2/2011 |
| JP | 2011-054502 A | 3/2011 |
| WO | 2005/011043 A1 | 2/2005 |
| WO | 2011/040474 A1 | 4/2011 |
| WO | 2011/040562 A1 | 4/2011 |

OTHER PUBLICATIONS

International Search Report; PCT/JP2013/058023; May 7, 2013.
The extended European search report issued by the European Patent Office on Oct. 16, 2015, which corresponds to European Patent Application No. 13767450.3-1360 and is related to U.S. Appl. No. 14/383,938.
The First Office Action issued by the Chinese Patent Office on Dec. 1, 2015, which corresponds to Chinese Patent Application No. 201380014589.4 and is related to U.S. Appl. No. 14/383,938.

* cited by examiner

Primary Examiner — Basia Ridley
Assistant Examiner — James Erwin
(74) Attorney, Agent, or Firm — Studebaker & Brackett PC

(57) ABSTRACT

A porous membrane for a secondary battery, including non-conductive particles and a binder for a porous membrane, wherein the non-conductive particle is a polymer particle having a core-shell structure, the non-conductive particle has a core portion having a glass transition point of 30° C. to 90° C., the non-conductive particle has a shell portion having a glass transition point higher than that of the core portion by 10° C. or higher, a thickness of the shell portion is 0.01% to 3.0% of a number average particle diameter of the non-conductive particles, and a number average particle diameter (A) of the non-conductive particle and a number average particle diameter (B) of the binder for a porous membrane satisfy (A)>(B).

8 Claims, No Drawings

POROUS MEMBRANE FOR SECONDARY BATTERIES, METHOD FOR PRODUCING SAME, ELECTRODE FOR SECONDARY BATTERIES, SEPARATOR FOR SECONDARY BATTERIES, AND SECONDARY BATTERY

FIELD

The present invention relates to a porous membrane for a secondary battery and a method for producing the same, and an electrode for a secondary battery, a separator for a secondary battery, and a secondary battery that have the porous membrane for a secondary battery.

BACKGROUND

In a secondary battery, a separator is generally used for preventing short circuit between a positive electrode and a negative electrode. The separator may affect the performance of the secondary battery. For this reason, a variety of studies have been conducted regarding separators (see Patent Literatures 1 to 3).

CITATION LIST

Patent Literature

Patent Literature 1: Japanese Patent Application Laid-Open No. 2006-182925 A
Patent Literature 2: Japanese Patent Application Laid-Open No. 2011-54502 A
Patent Literature 3: Japanese Patent Application Laid-Open No. 2011-23186 A

SUMMARY

Technical Problem

A usual separator includes organic separators made of, e.g., polyolefin such as polyethylene and polypropylene. When temperature of the secondary battery reaches high level by internal and external stimulation, such a separator may shrink. This shrinkage may cause short circuit between the positive electrode and the negative electrode, electrical energy release, etc.

In order to suppress such shrinkage at high temperature, there has been made studies on provision of a porous membrane containing non-conductive particles on a separator. When a separator is provided with a porous membrane, the strength of the separator is enhanced, and the safety is improved.

There is also a proposal to provide the porous membrane on a surface of an electrode. The porous membrane is usually not prone to cause heat shrinkage. Therefore, when the porous membrane is provided on a surface of an electrode, risk of short circuit largely reduces, whereby a significant improvement of safety is expected. Further, when the porous membrane is provided, an electrode active material can also be prevented from falling in a process of producing a battery. Since the porous membrane has pores, an electrolytic solution can permeate the porous membrane. Therefore the porous membrane does not inhibit battery reaction.

In a separator and an electrode that have the porous membrane, the porous membrane is required to have excellent adhesion property. Therefore, it is considered to use a porous membrane containing a binding agent. However, when the porous membrane contains a large amount of binding agent, blocking is likely to occur. In general, the separator and electrode having the porous membrane are in a sheet shape. The separator and electrode in a sheet shape are usually conveyed and stored in a state of being wound up in a roll shape. However, although the porous membrane containing a large amount of binding agent induce excellent adhesion property, such a porous membrane may incur blocking of separators or electrodes that are stacked when they are in a roll shape.

From the viewpoint of stably preventing short circuit, the porous membrane is required to have a property that non-conductive particles therein does not easily drop off the porous membrane. Such a phenomenon in which non-conductive particles drop off the porous membrane is referred to as "powder falling".

The present invention is created in view of the aforementioned problems. It is an object of the present invention to provide a porous membrane for a secondary battery that has excellent adhesion property and anti-blocking property and has low tendency to cause powder falling, and a method for producing the same, and an electrode for a secondary battery, a separator for a secondary battery, and a secondary battery having such a porous membrane for a secondary battery.

Means for Solving the Problem

The present inventor has intensively studied to solve the aforementioned problems. As a result, the present inventor has found out that when, in a porous membrane containing non-conductive particles and a binder for a porous membrane, polymer particles having a specific core-shell structure are used as the non-conductive particles, the porous membrane that has excellent adhesion property and anti-blocking property and has low tendency to cause powder falling can be achieved. Thus, the present invention has been completed.

Accordingly, the present invention is as follows:

(1) A porous membrane for a secondary battery, comprising non-conductive particles and a binder for a porous membrane, wherein
the non-conductive particle is a polymer particle having a core-shell structure,
the non-conductive particle has a core portion having a glass transition point of 30° C. to 90° C.,
the non-conductive particle has a shell portion having a glass transition point higher than that of the core portion by 10° C. or higher,
a thickness of the shell portion is 0.01% to 3.0% of a number average particle diameter of the non-conductive particles, and
a number average particle diameter (A) of the non-conductive particle and a number average particle diameter (B) of the binder for a porous membrane satisfy (A)>(B).

(2) The porous membrane for a secondary battery according to (1), wherein the shell portion of the non-conductive particles and the binder for a porous membrane contain 50% by weight or more of (meth)acrylate unit.

(3) The porous membrane for a secondary battery according to (1) or (2), wherein the non-conductive particles have a number average particle diameter of 100 nm to 1,500 nm.

(4) A method for producing the porous membrane for a secondary battery according to any one of (1) to (3), comprising:

mixing the non-conductive particles, the binder for a porous membrane, and a medium to prepare a slurry for a porous membrane;

applying the slurry for a porous membrane onto a substrate to form a slurry layer; and drying the slurry layer.

(5) The method according to (4), wherein the medium is an aqueous medium, and the slurry for a porous membrane is an aqueous dispersion.

(6) An electrode for a secondary battery, comprising:

a current collector;

an electrode material layer that contains an electrode active material and a binding agent for an electrode material layer, and adheres to the current collector, and the porous membrane according to any one of (1) to (3) that is formed on the electrode material layer.

(7) A separator for a secondary battery, comprising:

an organic separator; and the porous membrane according to any one of (1) to (3) that is formed on the organic separator.

(8) A secondary battery comprising a positive electrode, a negative electrode, a separator, and an electrolytic solution, wherein at least any one of the positive electrode, the negative electrode, and the separator has the porous membrane according to any one of (1) to (3).

Advantageous Effects of Invention

According to the present invention, a porous membrane for a secondary battery that has excellent adhesion property and anti-blocking property and has low tendency to cause powder falling can be realized. According to the present invention a method for producing the same, and an electrode for a secondary battery, a separator for a secondary battery, and a secondary battery having the porous membrane for a secondary battery can also be realized.

DESCRIPTION OF EMBODIMENTS

The present invention will be described in detail hereinbelow with reference to embodiments and illustrations. However, the present invention is not limited to the following embodiments and illustrations. The present invention may be implemented with any modifications without departing from the scope of claims of the present invention and equivalents thereto.

In the following description, (meth)acrylic acid includes both acrylic acid and methacrylic acid.

(Meth)acrylate includes both acrylate and methacrylate.

(Meth)acrylonitrile includes both acrylonitrile and methacrylonitrile.

That substance that is water-soluble means that, when 0.5 g of the substance is dissolved in 100 g of water at 25° C., the insoluble content is less than 0.5% by weight. In contrast, that a substance that is water-insoluble means that, when 0.5 g of the substance is dissolved in 100 g of water at 25° C., the insoluble content is 90% by weight or more.

[1. Porous Membrane]

A porous membrane for a secondary battery of the present invention (this may be referred to hereinbelow as "porous membrane") contains non-conductive particles and a binder for a porous membrane. The non-conductive particle is a polymer particle having a core-shell structure. The core-shell structure herein refers to a structure of a particle that has a core portion inside the particle and a shell portion with which the core portion is covered. In the non-conductive particles according to the present invention, the core portion has a glass transition point within a specific temperature range, and the shell portion has a glass transition point that is higher than that of the core portion by a specific temperature or higher. The thickness of the shell portion falls within a specific range relative to the number average particle diameter of the non-conductive particles. Further, the number average particle diameter (A) of the non-conductive particles and the number average particle diameter (B) of the binder for a porous membrane satisfy (A)>(B).

By having such a structure, the porous membrane of the present invention has excellent adhesion property and anti-blocking property and has low tendency to cause powder falling. The reason why the porous membrane of the present invention can exert such excellent effects is not clearly identified. However, according to the studies by the present inventor, the reason is deduced as follows.

i. Adhesion Property

In the non-conductive particles according to the present invention, since the core portion usually has a relatively low glass transition point, the core portion may be melted by heat during heat pressing. However, since the shell portion has a relatively high glass transition point, usually the shell portion is not melted by heat during heat pressing. Therefore, during heat pressing, the core portion is melted inside the shell portion that maintains the curing state. At this time, when the shell portion is broken by a pressure applied during heat pressing, part of polymer of the core portion in a melting state flows out through a crack of the broken shell portion. The flowing polymer adheres to other non-conductive particles, an organic separator, and an electrode. The porous membrane is then cooled, and the polymer is cured while the adhering state is maintained. As a result, the non-conductive particles are strongly bonded to the other non-conductive particles, the organic separator, and the electrode. Therefore, the adhesion property of the porous membrane can be enhanced. Further, the binder for a porous membrane generally has binding property. Therefore, the binding property of the binder for a porous membrane also contributes to enhancement of the adhesion property of the porous membrane.

In this case, in order to bring about the aforementioned breakage of the shell portion by the pressure application during heat pressing, the thickness of the shell portion of the non-conductive particles is controlled to a specific thin range. Thus, the polymer of the core portion that may exert high adhesion property can flow out of the shell portion.

On the other hand, when the shell portion is crushed into excessively fine pieces as a result of the breakage by heat pressing, the pores of the porous membrane may be occluded. Therefore, the thickness of the shell portion of the non-conductive particles according to the present invention is controlled so as to be equal to or more than a specific thickness in order not to crush the shell portion to a fine degree to occlude a gap between the non-conductive particles. As a result, the pores of the porous membrane are not occluded. Since the shell portion is not finely crushed, part of the core portion remains inside the shell portion even after heat pressing, and the core-shell structure of the non-conductive particles is maintained.

ii. Anti-Blocking Property

The binder for a porous membrane generally has binding property. Therefore, when the content of the binder for a porous membrane in the porous membrane is large, the adhesion property of the porous membrane is improved, but blocking is likely to occur. On the other hand, the core portion of the non-conductive particles in the porous membrane of the present invention may be melted and flows out of the shell portion to improve the adhesion property. Thus, the amount of the binder for a porous membrane can be decreased. The surface of the non-conductive particles is in a cured state that has low friction. Therefore, the non-conductive particles are unlikely to cause blocking. In particular, since the shell portion present on the surface of the non-conductive particles has high glass transition point, the shell portion has high hardness and low friction. Therefore, the friction on the surface of the porous membrane can be effectively reduced by the action of the non-conductive particles having the shell portion that has low friction. Therefore, when electrodes for a secondary battery of the present invention (this may be referred to hereinbelow as "battery of the present invention") or separators for a secondary battery of the present invention (this may be referred to hereinbelow as "separator of the present invention") that has the porous membrane are stacked, the frictional force between the stacked electrodes of the present invention or the stacked separators of the present invention is unlikely to increase. Therefore, the porous membrane of the present invention has excellent anti-blocking property.

iii. Powder Falling

As described above, the non-conductive particles are strongly bonded to one another by the actions of the core portion flowing out of the shell portion and the binder for a porous membrane. Therefore, the non-conductive particles are unlikely to be separated from the porous membrane. Accordingly, the porous membrane of the present invention has low tendency to cause powder falling.

[1.1. Non-Conductive Particles]

The non-conductive particle is a polymer particle, and has a core-shell structure. That is, the non-conductive particle has a core portion containing a polymer and a shell portion containing a polymer.

(Core Portion)

The core portion of the non-conductive particle has a glass transition point of usually 30° C. or higher, preferably 35° C. or higher, and more preferably 40° C. or higher. By having such a feature, the flowability of the polymer of the core portion during heat pressing can be suppressed to a level that is not excessively high, whereby decrease in the porosity of the porous membrane can be prevented, and the rate property of the secondary battery can be increased. Further, the polymer of the core portion flowing out of the shell portion is prevented from melting in using environment of the secondary battery, whereby the anti-blocking property can be enhanced.

The core portion of the non-conductive particle has a glass transition point of usually 90° C. or lower, preferably 80° C. or lower, and more preferably 75° C. or lower. By having such a feature, the core portion may be melted during heat pressing, and the polymer of the core portion can thereby flow out of the broken shell portion. Therefore, the adhesion property and anti-powder falling property of the porous membrane can be improved, and the cycle property of the secondary battery can be enhanced.

The glass transition point can be measured as follows. First, 10 mg of a weighed sample for measurement is put into an aluminum pan. The DSC curve thereof is determined with a differential thermal analysis device using an empty aluminum pan as a reference at a measurement temperature range of −100° C. to 500° C. and a temperature increasing rate of 10° C./min under normal temperature and normal humidity. During the heating process, the intersection of a base line immediately before a endothermic peak of the DSC curve in which the differential signal (DDSC) is 0.05 mW/min/mg or more and a tangent line of the DSC curve at an inflection point that appears for the first time after the endothermic peak is taken as the glass transition point (Tg).

The polymer forming the core portion may be a homopolymer obtained by polymerization of one type of polymerizable monomer or a copolymer obtained by polymerization of two or more types of polymerizable monomers. Examples of the polymerizable monomer may include an aromatic monovinyl compound such as styrene, ethylvinylbenzene, α-methylstyrene, fluorostyrene, and vinylpyridine; a vinyl cyanide compound such as acrylonitrile and methacrylonitrile; an acrylic acid ester monomer such as butyl acrylate, 2-ethylhexylethyl acrylate, glycidyl acrylate, and N,N'-dimethylaminoethyl acrylate; a methacrylic acid ester monomer such as butyl methacrylate, 2-ethylhexyl methacrylate, methyl methacrylate, 2-hydroxyethyl methacrylate, and N,N'-dimethylaminoethyl methacrylate; a mono- or dicarboxylic acid such as acrylic acid, methacrylic acid, maleic acid, and itaconic acid, and an acid anhydride of dicarboxylic acid; an amide-based monomer such as acrylamide, methacrylamide, N-methylolacrylamide, and N-methylolmethacrylamide; a monomer containing a carbon-carbon double bond and an epoxy group such as allyl glycidyl ether and glycidyl methacrylate; a conjugated double bond compound such as butadiene and isoprene; a vinyl ester compound such as vinyl acetate; 4-methyl-1-pentene; and an α-olefin compound. Among them, styrene and butyl acrylate are preferable. As the monomer, one type thereof may be solely used, or two or more thereof may be used in combination at any ratio.

(Shell Portion)

The shell portion of the non-conductive particle has a glass transition point that is higher than that of the core portion usually by 10° C. or higher, preferably 20° C. or higher, and more preferably 30° C. or higher. Since the shell portion has such a high glass transition point, the shell portion is not melted during heat pressing, and the shell portion is not melted even during usual conditions for using a secondary battery. Therefore, the surface of the non-conductive particle is in a cured state that has low friction, whereby blocking can be prevented. Further, since the shell portion is not melted, the non-conductive particle can maintain its particle shape. Therefore, the porous property and rigidity of the porous membrane can be maintained. The upper limit of the glass transition point of the shell portion is usually higher than the glass transition point of the core portion by 200° C.

As the polymer forming the shell portion, a polymer containing a (meth)acrylate unit is preferably used. The (meth)acrylate unit herein means a structural unit formed by polymerization of one or both of acrylate and methacrylate. When the shell portion is formed by the polymer containing a (meth)acrylate unit, the electric stability of the porous membrane can be improved. When both the shell portion and the binder for a porous membrane contain the (meth)acrylate unit, the affinity between the shell portion and the binder for a porous membrane can be improved, and anti-powder falling property can be improved.

Examples of acrylate may include methyl acrylate, ethyl acrylate, butyl acrylate, and 2-ethylhexylethyl acrylate.

Examples of methacrylate may include methyl methacrylate, butyl methacrylate, and 2-ethylhexyl methacrylate.

One type thereof may be solely used, or two or more thereof may be used in combination at any ratio.

The ratio of the (meth)acrylate unit in the polymer forming the shell portion is usually 50% by weight or more, preferably 60% by weight or more, and more preferably 70% by weight or more, and usually 100% by weight or less. Thereby the electric stability of the porous membrane can be improved. Further, when both the shell portion and the binder for a porous membrane contain the (meth)acrylate unit, anti-powder falling property can be improved. The ratio of the (meth)acrylate unit in the polymer forming the shell portion is usually the same as the ratio (addition ratio) of acrylate and methacrylate in the total monomers for the polymer forming the shell portion.

The shell portion may be a polymer of a monomer other than acrylate and methacrylate or a copolymer of one or both of acrylate and methacrylate with another monomer. Examples of the monomer other than acrylate and methacrylate may include an aliphatic conjugate diene monomer such as 1,3-butadiene, 2-methyl-1,3-butadiene, 2,3-dimethyl-1,3-butadiene, and 2-chloro-1,3-butadiene; and an aromatic vinyl monomer such as styrene, α-methylstyrene, vinyltoluene, and divinylbenzene. One type thereof may be solely used, or two or more thereof may be used in combination at any ratio.

The thickness of the shell portion is usually 0.01% or more, preferably 0.03% or more, more preferably 0.05% or more, and further preferably 0.1% or more, and usually 3.0% or less, preferably 2.0% or less, and more preferably 1.0% or less, of the number average particle diameter of the non-conductive particles. When the thickness of the shell portion is equal to or more than the lower limit of the range, the strength of the shell portion can be enhanced. The unbreakability of the shell portion can thereby be adjusted such that the core-shell structure is damaged during heat pressing. Therefore, the pores of the porous membrane can be prevented from being occluded to improve the liquid permeability. Accordingly, the rate property of the secondary battery can be enhanced. In contrast, when the thickness of the shell portion is equal to or less than the upper limit of the range, the strength of the shell portion can be appropriately attenuated. Therefore, the shell portion can be made breakable during heat pressing so that the polymer forming the core portion can flow out of the shell portion. Therefore, the adhesion property and the anti-powder falling property of the porous membrane can be improved, and the cycle property of the secondary battery can be enhanced.

For example, the thickness (S) of the shell portion can be calculated from the number average particle diameter (D1) of seed polymer particles (see core particles in Examples) before formation of the shell portion and the number average particle diameter (D2) of the non-conductive particles after formation of the shell portion by the following expression.

$$(D2-D1)/2=S$$

The number average particle diameter of particles may be measured as follows. From a photograph taken at a magnification of 25,000 with a field emission scanning electron microscope, 200 particles are randomly selected. The particle diameter is (La+Lb)/2 wherein La is the longest side of particle images and Lb is the shortest side. The average of particle diameters of the 200 particles is calculated as the average particle diameter.

(Size of Non-Conductive Particles)

The number average particle diameter of the non-conductive particles is usually 100 nm or larger, preferably 200 nm or larger, and more preferably 300 nm or larger, and usually 1,500 nm or smaller, preferably 1,200 nm or smaller, and more preferably 1,000 nm or smaller. When the number average particle diameter of the non-conductive particles falls within the range, a gap between the non-conductive particles can be adjusted such that the non-conductive particles has portions for contacting each other, and that movement of ions is not inhibited. Therefore, the strength of the porous membrane can be enhanced and the short circuit of the battery can be prevented. In addition, the cycle property of the secondary battery can be improved.

(Amount of Non-Conductive Particles)

The containing ratio of the non-conductive particles in the porous membrane of the present invention is usually 70% by weight or more, preferably 75% by weight or more, and more preferably 80% by weight or more, and usually 98% by weight or less, preferably 96% by weight or less, and more preferably 94% by weight or less. When the containing ratio of the non-conductive particles in the porous membrane of the present invention falls within the range, a gap between the non-conductive particles can be adjusted such that the non-conductive particles has portions for contacting each other, and that movement of ions is not inhibited. Therefore, when the containing ratio of the non-conductive particles falls within the range, the strength of the porous membrane of the present invention can be increased, and the short circuit of the battery can be stably prevented.

(Method for Producing Non-Conductive Particles)

The method for producing non-conductive particles having a core-shell structure is not particularly limited. For example, the non-conductive particles may be obtained by a sequential multi-step seed emulsion polymerization method and a sequential multi-step suspension polymerization method, in which a polymer of a prior step is in turn covered with a polymer of a later step.

One example of a case wherein the non-conductive particles having a core-shell structure are obtained by the multi-step seed emulsion polymerization method will be described.

The polymerization is performed in accordance with a conventional method. As an emulsifier, e.g., an anionic surfactant such as sodium dodecylbenzenesulfonate and sodium dodecylsulfonate, a nonionic surfactant such as polyoxyethylene nonyl phenyl ether and sorbitane monolaurate, or a cationic surfactant such as octadecylamine acetate may be used. As a polymerization initiator, e.g., tert-butylperoxy-2-ethylhexanoate, potassium persulfate, a peroxide such as cumene peroxide, or an azo compound such as 2,2'-azobis(2-methyl-N-(2-hydroxyethyl)-propionamide) and 2,2'-azobis(2-aminodipropane) hydrochloride may be used.

In the polymerization procedure, a step of producing the polymer of the prior step is first performed. In this step, the monomer and the emulsifier are mixed and the mixture is collectively subjected to emulsion polymerization to prepare seed polymer particles. Alternatively, an emulsion in which the monomer and the emulsifier are mixed is sequentially added for performing emulsion polymerization to prepare seed polymer particles. Subsequently, as the step of covering the polymer of the prior step with the polymer of the later step in turn, the monomer forming the core portion is subjected to seed polymerization in the presence of the seed polymer particles to obtain core particles. Then, in the presence of the core particles, seed polymerization of the monomer for constituting the shell portion is performed. Thus, the non-conductive particles having a core-shell structure can be obtained.

The number average particle diameter of the core particles and the average particle diameter of the non-conductive particles after formation of the shell portion may be set within a desired range by adjustment of the amount of the emulsifier, the amount of the monomer, etc.

[1.2. Binder for Porous Membrane]

The binder for a porous membrane is a component capable of functioning as a binding agent in the porous membrane. The binder for a porous membrane usually has a particle shape in the porous membrane and a slurry for a porous membrane which will be described below. The particles are interposed between the non-conductive particles, and between the non-conductive particles and the substrate, to thereby exert binding ability.

As a polymer for forming the binder for a porous membrane, a variety of polymers may be used as long as they have binding property. Among them, a polymer containing a (meth)acrylate unit is preferably used from the viewpoint of increasing the affinity with the shell portion of the non-conductive particles to improve the anti-powder falling property. Examples of acrylate and methacrylate forming the (meth)acrylate unit may include those exemplified in the section for describing the non-conductive particles. As the acrylate and methacrylate, one type thereof may be solely used, or two or more thereof may be used in combination at any ratio.

The ratio of the (meth)acrylate unit in the binder for a porous membrane is usually 50% by weight or more, preferably 60% by weight or more, and more preferably 70% by weight or more, and usually 100% by weight or less. Thereby the electric stability of the porous membrane can be improved. Further, when both the shell portion and the binder for a porous membrane contain the (meth)acrylate unit, the anti-powder falling property can be improved. The ratio of the (meth)acrylate unit in the binder for a porous membrane is usually the same as the ratio (addition ratio) of acrylate and methacrylate in the total monomers for the binder for a porous membrane.

The binder for a porous membrane may be a polymer of a monomer other than acrylate and methacrylate or a copolymer of one or both of acrylate and methacrylate with another monomer. Examples of the monomer other than acrylate and methacrylate may include a vinyl monomer having an acid group, an α,β-unsaturated nitrile monomer, and a monomer having a crosslinking group. It is preferable that they are copolymerized with acrylate or methacrylate. One type thereof may be solely used, or two or more thereof may be used in combination at any ratio.

Examples of the acid group in the vinyl monomer having an acid group may include a —COON group (carboxylic acid group), an —OH group (hydroxyl group), an —SO$_3$H group (sulfonic acid group), a —PO$_3$H$_2$ group, and a —PO(OH)(OR) group (wherein R represents a hydrocarbon group). As the vinyl monomer having an acid group, any vinyl monomer having any of these acid group may be used. Further, a monomer having a lower polyoxyalkylene group or an acid anhydride that is hydrolyzed to produce a carboxylic acid group may also be used as the vinyl monomer having an acid group. Among them, a monomer having a carboxylic acid group is preferable since the binding property to an electrode material layer or an organic separator is excellent and a transition metal ion eluted from a positive electrode active material can be effectively trapped.

Examples of the monomer having a carboxylic acid group may include monocarboxylic acid, dicarboxylic acid, anhydride of dicarboxylic acid, and derivatives thereof. Examples of monocarboxylic acid may include acrylic acid, methacrylic acid, crotonic acid, 2-ethylacrylic acid, isocrotonic acid, α-acetoxyacrylic acid, β-trans-aryloxyacrylic acid, α-chloro-β-E-methoxyacrylic acid, and β-diaminoacrylic acid. Examples of dicarboxylic acid may include maleic acid, fumaric acid, itaconic acid, methylmaleic acid, dimethylmaleic acid, phenylmaleic acid, chloromaleic acid, dichloromaleic acid, fluoromaleic acid, and maleic acid esters such as methylallyl maleate, diphenyl maleate, nonyl maleate, decyl maleate, dodecyl maleate, octadecyl maleate, and fluoroalkyl maleate. Examples of acid anhydride of dicarboxylic acid may include maleic anhydride, acrylic anhydride, methylmaleic anhydride, and dimethylmaleic anhydride. Among them, e.g., monocarboxylic acid having a carboxylic acid group and five or less carbon atoms, such as acrylic acid and methacrylic acid and dicarboxylic acid having two carboxylic acid groups and five or less carbon atoms, such as maleic acid and itaconic acid are preferable. From the viewpoint of high storage stability of the resulting slurry for a porous membrane, acrylic acid, methacrylic acid, and itaconic acid are further preferable. One type thereof may be solely used, or two or more thereof may be used in combination at any ratio.

The ratio (addition ratio) of the vinyl monomer having an acid group with respect to the monomers for the binder for a porous membrane is preferably 1.0% by weight or more, and more preferably 1.5% by weight or more, and preferably 3.0% by weight or less, and more preferably 2.5% by weight or less.

Examples of the α,β-unsaturated nitrile monomer may include acrylonitrile, methacrylonitrile, α-chloroacrylonitrile, and α-ethylacrylonitrile. Among them, acrylonitrile and methacrylonitrile are preferable from the viewpoint of improving the mechanical strength of the porous membrane and the binding power in the porous membrane. One type thereof may be solely used, or two or more thereof may be used in combination at any ratio.

The ratio (addition ratio) of the α,β-unsaturated nitrile monomer with respect to the total monomers for the binder for a porous membrane is preferably 1.0% by weight or more, and preferably 50% by weight or less, more preferably 40% by weight or less, and particularly preferably 30% by weight or less.

Examples of the monomer having a crosslinking group may include a monofunctional monomer having a crosslinking group and one olefinic double bond, and a polyfunctional monomer having at least two olefinic double bonds.

It is preferable that the crosslinking group is at least one selected from the group consisting of an epoxy group, an N-methylolamido group, an oxetanyl group, and an oxazoline group. Among them, the epoxy group and the N-methylolamido group are more preferable since crosslinking and crosslink density can be easily controlled.

Examples of the monomer having an epoxy group as the crosslinking group may include a monomer containing a carbon-carbon double bond and an epoxy group and a monomer having a halogen atom and an epoxy group.

Examples of the monomer containing a carbon-carbon double bond and an epoxy group may include an unsaturated glycidyl ether such as vinyl glycidyl ether, allyl glycidyl ether, butenyl glycidyl ether, and o-allyl phenyl glycidyl ether; monoepoxide of diene or polyene such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxide such as 3,4-epoxy-1-butene, 1,2-epoxy-5-hexene, and 1,2-epoxy-9-decene; and glycidyl esters of an unsaturated carboxylic acid such as glycidyl acrylate, glycidyl methacrylate, glycidyl crotonate, glycidyl 4-heptenoate, glycidyl sorbate, glycidyl linoleate, glycidyl 4-methyl-3-pentenoate, a glycidyl ester of 3-cyclohexenecarboxylic acid, and a glycidyl ester of 4-methyl-3-cyclohexene carboxylic acid.

Examples of the monomer having a halogen atom and an epoxy group may include epihalohydrin such as epichlorohydrin, epibromohydrin, epiiodohydrin, epifluorohydrin, and β-methylepichlorohydrin; p-chlorostyrene oxide; and dibromophenyl glycidyl ether.

Examples of the monomer having an N-methylolamido group as the crosslinking group may include N-methylolacrylamide and N-methylolmethacrylamide.

Examples of the polyfunctional monomer having at least two olefinic double bonds may include allyl acrylate, allyl methacrylate, trimethylolpropane triacrylate, trimethylolpropane methacrylate, dipropylene glycol diallyl ether, polyglycol diallyl ether, triethylene glycol divinyl ether, hydroquinone diallyl ether, tetraallyloxyethane, another allyl or vinyl ether of polyfunctional alcohol, tetraethylene glycol diacrylate, triallylamine, trimethylolpropane diallyl ether, methylene bisacrylamide, and divinylbenzene. Among them, allyl acrylate, allyl methacrylate, trimethylolpropane triacrylate, and trimethylolpropane methacrylate are preferable. In particular, acrylate and methacrylate having an allyl group such as ally acrylate and allyl methacrylate are preferable because of crosslink density improvement and high copolymerizability.

As the monomer having a crosslinking group, one type thereof may be solely used, or two or more thereof may be used in combination at any ratio.

The ratio (addition ratio) of the monomer having a crosslinking group with respect to the total monomers for the binder for a porous membrane is preferably 0.02% by weight or more, more preferably 0.1% by weight or more, and particularly preferably 0.2% by weight or more, and preferably 4.0% by weight or less, more preferably 3.5% by weight or less, and particularly preferably 3.0% by weight or less. Thereby dissolution of the binder for a porous membrane in an electrolytic solution can be suppressed and excellent porous membrane strength and long-term cycle property can be achieved.

The glass transition point of the binder for a porous membrane is usually −80° C. or higher, preferably −70° C. or higher, and more preferably −60° C. or higher, and usually 60° C. or lower, preferably 30° C. or lower, and more preferably 0° C. or lower. When the glass transition point of the binder for a porous membrane is equal to or higher than the lower limit of the range, the pores of the porous membrane can be prevented from being occluded to improve the liquid permeability. Therefore, the rate property of the secondary battery can be enhanced. When the glass transition point is equal to or lower than the upper limit, the binding property of the binder for a porous membrane can be increased and the powder falling of the non-conductive particles can be stably prevented.

The number average particle diameter (A) of the non-conductive particles and the number average particle diameter (B) of the binder for a porous membrane satisfy a relationship of (A)>(B). By satisfying such a relationship, the anti-blocking property of the porous membrane can be enhanced. When (A)≤(B), that is, the number average particle diameter of particles of the binder for a porous membrane is equal to or more than the number average particle diameter of the non-conductive particles, the porous membrane would have a structure in which the non-conductive particles are interposed between the particles of the binder for a porous membrane. In this case, not the non-conductive particles but the binder for a porous membrane occupies a large part of exposure area on a surface of the porous membrane. Therefore, the friction on the surface of the porous membrane increases, and blocking easily occurs.

Therefore, in order to take advantage of the anti-blocking property that the non-conductive particles has, in the porous membrane of the present invention, the number average particle diameter of the particles of the binder for a porous membrane is made smaller than the number average particle diameter of the non-conductive particles. When the number average particle diameter of the particles of the binder for a porous membrane is made smaller than the number average particle diameter of the non-conductive particles, the polymer of the core portion that flows out of the shell portion is likely to adhere to an organic separator or an electrode. Therefore, the adhesion property and the anti-powder falling property of the porous membrane can be improved.

Specifically, the number average particle diameter of the particles of the binder for a porous membrane may be set in accordance with the particle diameter of the non-conductive particle, and is usually 50 nm or larger, preferably 100 nm or larger, and more preferably 150 nm or larger, and usually 1,000 nm or smaller, preferably 800 nm or smaller, and more preferably 600 nm or smaller. When the number average particle diameter of the binder for a porous membrane is equal to or more than the lower limit of the range, the porous property of the porous membrane can be maintained at a high level, the resistance of the porous membrane can be suppressed, and the battery properties can be kept well. When it is equal to or less than the upper limit, the number of the binding point of the non-conductive particles and the substrate with the binder for a porous membrane can increase and the powder falling can be stably prevented.

The amount of the binder for a porous membrane is preferably 3 parts by weight or more, more preferably 7 parts by weight or more, and particularly preferably 11 parts by weight or more, relative to 100 parts by weight of the non-conductive particles. Further, the amount of the binder for a porous membrane is preferably 26 parts by weight or less, more preferably 22 parts by weight or less, and particularly preferably 18 parts by weight or less, relative to 100 parts by weight of the non-conductive particles. When the amount of the binder for a porous membrane is equal to or more than the lower limit of the range, the powder falling of the non-conductive particles can be stably prevented. When it is equal to or less than the upper limit of the range, the porous property of the porous membrane can be maintained at a high level, the resistance of the porous membrane can be suppressed, and the battery physical properties can be kept well.

The method for producing the binder for a porous membrane is not particularly limited. For example, any method such as a solution polymerization method, a suspension polymerization method, and an emulsion polymerization method may be used. Among them, the emulsion polymerization method and the suspension polymerization method are preferable since polymerization can be performed in water and the polymer as it is can be used as a material for a slurry for a porous membrane.

[1.3. Optional Component]

In addition to the aforementioned components, the porous membrane of the present invention may contain an optional component. The optional component is not particularly limited as long as the component does not cause excessively unfavorable effects on a battery reaction in the secondary battery of the present invention. The number of types of optional components may be only one, and may also be two or more.

[1.4. Method for Producing Porous Membrane]

The porous membrane of the present invention may be produced by, e.g., a production method including steps of mixing non-conductive particles, a binder for a porous membrane, and a medium to obtain a slurry for a porous membrane, applying the slurry for a porous membrane onto a substrate to obtain a slurry layer, and drying the slurry layer. This production method will be described hereinbelow.

The slurry for a porous membrane is a fluid composition containing the non-conductive particles, the binder for a porous membrane, and a medium. In the slurry for a porous membrane, the non-conductive particles and the binder for a porous membrane are usually dispersed in the medium.

As the medium, an aqueous medium is usually used. By using an aqueous medium, the slurry for a porous membrane is obtained as an aqueous dispersion. As the aqueous medium, water is usually used.

Usually, the amount of the medium in the slurry for a porous membrane may be set to any amount within a range wherein the slurry for a porous membrane has such a viscosity that the workability is not impaired in the production of the porous membrane of the present invention. Specifically, the amount of the medium may be set so that the solid content concentration of the slurry for a porous membrane is usually 5% by weight to 30% by weight.

In addition to the non-conductive particles, the binder for a porous membrane and the medium, the slurry for a porous membrane may contain an optional component. The optional component is not particularly limited as long as the component does not cause excessively favorable effects on a battery reaction in the secondary battery. The number of types of optional components may be only one, and may also be two or more.

Examples of the optional component may include a viscosity modifier. As the viscosity modifier, a polymer capable of being dissolved in the medium may be usually used. For example, when water is used as the medium, a water-soluble polymer is used as the viscosity modifier. When the aqueous medium is used as the medium in the slurry for a porous membrane, a part of the viscosity modifier is dissolved in the medium, and another part of the viscosity modifier is adsorbed on the surfaces of the non-conductive particles and the binder for a porous membrane. Thereby the non-conductive particles and the binder for a porous membrane are covered with a layer of the viscosity modifier (dispersion stabilizing layer) to improve the dispersibility of the non-conductive particles and the binder for a porous membrane in water.

Examples of the viscosity modifier may include a cellulose-based polymer such as carboxymethyl cellulose, methyl cellulose, and hydroxypropyl cellulose, and an ammonium salt and an alkali metal salt thereof; (modified) poly(meth) acrylic acid and an ammonium salt and an alkali metal salt thereof; polyvinyl alcohols such as (modified) polyvinyl alcohol, a copolymer of acrylic acid or acrylic acid salt and vinyl alcohol, and a copolymer of maleic anhydride, maleic acid, or fumaric acid and vinyl alcohol; polyethylene glycol, polyethylene oxide, polyvinylpyrrolidone, modified polyacrylic acid, oxide starch, phosphoric acid starch, casein, and a variety of modified starches. Herein, "(modified) poly-" includes both "unmodified poly-" and "modified poly-".

The amount of the viscosity modifier is usually 0.03 parts by weight or more, preferably 0.18 parts by weight or more, and more preferably 0.3 parts by weight or more, and usually 19 parts by weight or less, preferably 15 parts by weight or less, and more preferably 12 parts by weight or less, relative to 100 parts by weight of the non-conductive particles.

When the amount of the viscosity modifier falls within the range, the application property of the slurry for a porous membrane can be improved.

Further, the slurry for a porous membrane may contain, e.g., a dispersing agent. Examples of the dispersing agent may include an anionic compound, a cationic compound, a nonionic compound, and a polymer compound. Usually, specific type of the dispersing agent is selected in accordance with the structure of the non-conductive particles.

The slurry for a porous membrane may contain a surfactant such as an alkyl-based surfactant, a silicon-based surfactant, a fluorine-based surfactant, and a metal-based surfactant. When the surfactant is contained, repelling during application of the slurry for a porous membrane can be prevented, and the smoothness of the electrode of the present invention can be improved. The amount of the surfactant is preferably within a range that does not affect the battery property, and is preferably 10% by weight or less in the porous membrane of the present invention.

The slurry for a porous membrane may contain nano-fine particles having a volume average particle diameter less than 100 nm, such as fumed silica and fumed alumina. When the nano-fine particles are contained, the thixotropy of the slurry for a porous membrane can be controlled, and the leveling property of the porous membrane of the present invention can be further improved.

Further, the slurry for a porous membrane may contain, e.g., an agent of inhibiting dispersion of an electrolytic solution.

In the production of the slurry for a porous membrane, a mixing order of the non-conductive particles, the binder for a porous membrane, and the medium, and the optional component that are used if necessary is not particularly limited. The mixing method therefor is not particularly limited. As a mixer, a disperser is usually used for rapidly dispersing the non-conductive particles.

It is preferable that the disperser is a device capable of uniformly dispersing and mixing the components. Examples thereof may include a ball mill, a sand mill, a pigment disperser, a grinder, a ultrasonic disperser, a homogenizer, and a planetary mixer. In particular, a high dispersion device such as a bead mill, a roll mill, and Filmix mixer is preferable since the device is capable of providing high dispersion shear.

After the preparation of the slurry for a porous membrane, the slurry for a porous membrane is applied onto a substrate to obtain a slurry layer. The substrate is a member on which the slurry layer is formed as a film of the slurry for a porous membrane. There is no restriction on substrate. For example, a release film may be used. In this case, the slurry for a porous membrane may be applied onto a surface of the release film to obtain a slurry layer, the slurry layer may be then dried to obtain a porous membrane, and the porous membrane may be removed from the release film. However, a battery element is usually used since the production efficiency is increased by omission of the step of removing the porous membrane of the present invention. Specific examples of the battery element may include an electrode and an organic separator.

Examples of the method for applying the slurry for a porous membrane may include a doctor-blade method, a dip method, a reverse roll method, a direct roll method, a gravure method, an extrusion method, and a brush method. Among them, the dip method and the gravure method are preferable since a uniform porous membrane can be obtained.

After the slurry layer is obtained, the slurry layer is dried. As a result, the porous membrane of the present invention is obtained. Examples of the drying method may include drying by air such as warm air, hot air, and low humid air; vacuum drying; and drying methods by irradiation with energy beam such as infrared ray, far infrared ray, and electron beam. The drying temperature is a temperature at which the medium is vaporized and removed from the coated film. When the binder for a porous membrane has a thermal crosslinking group, it is preferable that drying is performed at a high temperature that is equal to or higher than a temperature at which crosslinking reaction of the thermal crosslinking group is prompted. When the drying and the crosslinking reaction are simultaneously performed, the number of steps can be reduced, to thereby improve the production efficiency. The drying is usually performed at 40° C. to 120° C.

Further, in the method for producing a porous membrane, another step may be performed. For example, a pressurization treatment may be performed using a metal mold press, a roll press, etc. By performing such a treatment, the adhesion property between the substrate and the porous membrane of the present invention can be improved. When an electrode, an organic separator, etc. is used as the substrate, such a pressurization treatment is particularly useful. However, when the pressurization treatment is excessively performed, the porosity of the porous membrane of the present invention may be reduced. Therefore, it is preferable that the pressure and the pressurization time are appropriately controlled.

[1.5. Other Matters Regarding Porous Membrane]

The porous membrane of the present invention has voids between the non-conductive particles, and therefore it is appropriately porous, and can absorb an electrolytic solution. In this manner, the electrolytic solution can permeate the porous membrane of the present invention. Therefore, when the porous membrane of the present invention is provided in the electrode of the present invention or the separator of the present invention, the battery reaction is not inhibited, and a secondary battery having high rate property can be realized.

The thickness of the porous membrane of the present invention is preferably 0.5 μm to 20 μm. When the porous membrane of the present invention is provided on a surface of the electrode, the thickness of the porous membrane is preferably 1 μm to 10 μm. When the thickness of the porous membrane is equal to or more than the lower limit of this range, the thickness of the film can be made uniform. When the thickness is equal to or less than the upper limit, the capacity per the volume or weight in the battery can be increased.

[2. Electrode for Secondary Battery]

The electrode of the present invention (electrode for a secondary battery) has a current collector, an electrode material layer that adheres to the current collector, and the porous membrane of the present invention that is formed on the electrode material layer. The electrode material layer contains an electrode active material and a binding agent for an electrode material layer. Even when the porous membrane of the present invention is provided on a surface of the electrode material layer, the electrolytic solution can permeate the porous membrane of the present invention. Therefore, the porous membrane does not adversely affect the rate property. Further, the porous membrane of the present invention has strength to an appropriate degree. Therefore, when the porous membrane is provided on the surface of the electrode material layer, the porous membrane functions as a protection film and acts for preventing removal of the electrode active material in the process of producing the secondary battery, and for preventing short circuit during operation of the battery. Moreover, since the porous membrane of the present invention is provided, the electrode of the present invention has low tendency to cause blocking.

[2.1. Current Collector]

The current collector is not particularly limited as long as it is made of a material having electroconductivity and electrochemical durability. In particular, from the viewpoint of heat resistance, e.g., a metal material such as iron, copper, aluminum, nickel, stainless steel, titanium, tantalum, gold, and platinum is preferable. Among them, aluminum is particularly preferable for a positive electrode of a non-aqueous electrolyte secondary battery, and copper is particularly preferable for a negative electrode.

The shape of the current collector is not particularly limited. The current collector preferably has a sheet shape with a thickness of 0.001 mm to 0.5 mm.

It is preferable that the surface of the current collector is roughened in advance of its use for enhancing the adhesion strength to the electrode material layer. Examples of the roughening method may include a mechanical polishing method, an electrolysis polishing method, and a chemical polishing method. In the mechanical polishing method, e.g., an abrasive paper to which abrasive particles are fixed, a grind stone, an emery wheel, a wire brush having steel wire, etc. is used.

Further, in order to enhance the adhesion strength to the electrode material layer and improve the conductivity, an intermediate layer may be formed on the surface of the current collector.

[2.2. Electrode Material Layer]

(Electrode Active Material)

The electrode material layer contains an electrode active material. In the following description, particularly, an electrode active material for a positive electrode of the electrode active material is sometimes referred to as "positive electrode active material", and an electrode active material for a negative electrode is sometimes referred to as "negative electrode active material". Since the electrode of the present invention is usually used in a lithium secondary battery, an electrode active material for a lithium secondary battery will be particularly described.

As the electrode active material for a lithium secondary battery, a material to which a lithium ion can be reversibly intercalated and disintercalated by application of electric potential in an electrolytic solution may be used. As the electrode active material, an inorganic compound may be used. Alternatively, an organic compound may also be used.

A positive electrode active material is classified into a material made of an inorganic compound and a material made of an organic compound. Examples of the positive electrode active material made of an inorganic compound may include a transition metal oxide, a composite oxide of lithium and transition metal, and a transition metal sulfide. As the transition metal, Fe, Co, Ni, Mn, etc. is used. Specific examples of the inorganic compound used in the positive electrode active material may include a lithium-containing metal complex oxide such as $LiCoO_2$, $LiNiO_2$, $LiMnO_2$, $LiMn_2O_4$, $LiFePO_4$, and $LiFeVO_4$; a transition metal sulfide such as $TiS_2$, $TiS_3$, and amorphous $MoS_2$; and a transition metal oxide such as $Cu_2V_2O_3$, amorphous $V_2O$—$P_2O_5$, $MoO_3$, $V_2O_5$, and $V_6O_{13}$. Examples of the positive electrode active material made of an organic compound may include a conductive polymer such as polyacetylene and poly-p-phenylene.

Further, a positive electrode active material made of a composite material that is a combination of an inorganic compound and an organic compound may also be used.

Further, e.g., a composite material covered with a carbon material may be produced by reduction firing of an iron-based oxide in the presence of a carbon source substance. The composite material may be used as the positive electrode active material. The iron-based oxide tends to have poor electroconductivity. However, iron may be used as a high performance positive electrode active material when processed to be such a composite material.

A partial element substitution product of the aforementioned compound may also be used as the positive electrode active material.

As the positive electrode active material, one type thereof may be solely used, or two or more thereof may be used in combination at any ratio. Further, a mixture of the inorganic compound and the organic compound may also be used as the positive electrode active material.

The particle diameter of the positive electrode active material is appropriately selected depending on balance with other components of the battery. From the viewpoint of improving battery properties such as charge property and cycle property, the volume average particle diameter $D_{50}$ of the positive electrode active material is usually 0.1 µm or larger and preferably 1 µm or larger, and usually 50 µm or smaller and preferably 20 µm or smaller. When the volume average particle diameter $D_{50}$ of the positive electrode active material falls within this range, a secondary battery having a large charging/discharging capacity can be obtained, and handling during production of a mixture slurry and the electrode of the present invention is facilitated. The volume average particle diameter $D_{50}$ herein represents a particle diameter at which the cumulative volume calculated from a small-diameter side in a particle size distribution measured by a laser diffraction method reaches 50%.

Examples of the negative electrode active material may include a carbon material such as amorphous carbon, graphite, natural graphite, meso-carbon-microbeads, and pitch-based carbon fiber; and a conductive polymer such as polyacene. Examples the negative electrode active material may also include metal such as silicon, tin, zinc, manganese, iron, and nickel, and an alloy thereof; an oxide of the metal or the alloy; and a sulfate of the metal or the alloy. In addition, metallic lithium; a lithium alloy such as Li—Al, Li—Bi—Cd, and Li—Sn—Cd; a lithium transitional metal nitride; silicon; etc. may also be used. As the electrode active material, a material having a conductivity-imparting material attached to the surface of the material by a mechanical modifying method may also be used. As the negative electrode active material, one type thereof may be solely used, or two or more thereof may be used in combination at any ratio.

The particle diameter of the negative electrode active material is appropriately selected depending on balance with other components of the battery. From the viewpoint of improving battery properties such as early stage efficiency, charging property, and cycle property, the volume average particle diameter $D_{50}$ of the negative electrode active material is usually 1 µm or larger and preferably 15 µm or larger, and usually 50 µm or smaller and preferably 30 µm or smaller.

(Binding Agent for Electrode Material Layer)

The electrode material layer contains a binding agent for an electrode material layer. When the binding agent for an electrode material layer is contained, the adhesion property of the electrode material layer is improved, and the strength against mechanical force applied during a step of winding the electrode of the present invention increases. Since the electrode material layer is unlikely to be separated, possibility of short circuit, etc. caused by separated materials is reduced.

As the binding agent for an electrode material layer, a variety of polymer components may be used. For example, polyethylene, polytetrafluoroethylene (PTFE), polyvinylidene fluoride (PVDF), a tetrafluoroethylene-hexafluoropropylene copolymer (FEP), a polyacrylic acid derivative, a polyacrylonitrile derivative, etc., may be used.

In addition, a soft polymer exemplified below may also be used as the binding agent for an electrode material layer. Examples of the soft polymer may include:

(i) an acrylic soft polymer that is a homopolymer of a derivative of acrylic acid or methacrylic acid or a copolymer of the derivative and a monomer copolymerizable with the derivative, such as polybutyl acrylate, polybutyl methacrylate, polyhydroxyethyl methacrylate, polyacrylamide, polyacrylonitrile, a butyl acrylate-styrene copolymer, a butyl acrylate-acrylonitrile copolymer, and a butyl acrylate-acrylonitrile-glycidyl methacrylate copolymer;

(ii) an isobutylene-based soft polymer such as polyisobutylene, isobutylene-isoprene rubber, and an isobutylene-styrene copolymer;

(iii) a diene-based soft polymer such as polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer, a styrene-butadiene-styrene block copolymer, an isoprene-styrene block copolymer, and a styrene-isoprene-styrene block copolymer;

(iv) a silicon-containing soft polymer such as dimethyl polysiloxane, diphenyl polysiloxane, and dihydroxy polysiloxane;

(v) an olefin-based soft polymer such as liquid polyethylene, polypropylene, poly-1-butene, an ethylene-α-olefin copolymer, a propylene-α-olefin copolymer, an ethylene-propylene-diene copolymer (EPDM), and an ethylene-propylene-styrene copolymer;

(vi) a vinyl-based soft polymer such as polyvinyl alcohol, polyvinyl acetate, polyvinyl stearate, and a vinyl acetate-styrene copolymer;

(vii) an epoxy-based soft polymer such as polyethylene oxide, polypropylene oxide, and epichlorohydrin rubber;

(viii) a fluorine-containing soft polymer such as vinylidene fluoride rubber and ethylene tetrafluoride-propylene rubber; and (ix) other soft polymers such as natural rubber, polypeptide, protein, a polyester-based thermoplastic elastomer, a vinyl chloride-based thermoplastic elastomer, and a polyamide-based thermoplastic elastomer. These soft polymers may be a polymer having a crosslinking structure, or a polymer to which a functional group is introduced by modification.

As the binding agent for an electrode material layer, one type thereof may be solely used, or two or more thereof may be used in combination at any ratio.

The amount of the binding agent for an electrode material layer in the electrode material layer is preferably 0.1 parts by weight or more, more preferably 0.2 parts by weight or more, and particularly preferably 0.5 parts by weight or more, and preferably 5 parts by weight or less, more preferably 4 parts by weight or less, and particularly preferably 3 parts by weight or less, relative to 100 parts by weight of the electrode active material. When the amount of the binding agent for an electrode material layer falls within the range, removal of the electrode active material from the electrode material layer can be prevented without inhibition of a battery reaction.

The binding agent for an electrode material layer is usually prepared in a state of being contained in a solution or a dispersion for producing the electrode mixing material layer. In this case, the viscosity of the solution or the dispersion is usually 1 mPa·s or more and preferably 50 mPa·s or more, and usually 300,000 mPa·s or less and preferably 10,000 mPa·s or less. The viscosity is a value measured at 25° C. and a rotation speed of 60 rpm with a B type viscometer.

(Optional Component that May be Contained in Electrode Material Layer)

In addition to the electrode active material and the binding agent for an electrode material layer, an optional component may also be contained in the electrode material layer as long as the effects of the present invention are not significantly impaired. Examples thereof may include a conductivity-imparting material (which may also referred to as conductive material) and a reinforcement material. As the optional component, one type thereof may be solely used, or two or more thereof may be used in combination at any ratio.

Examples of the conductivity-imparting material may include conductive carbon such as acetylene black, ketchen black, carbon black, graphite, vapor phase growth carbon fibers, and carbon nanotube; carbon powders such as graphite; and fibers and foil of a variety of metals. When the conductivity-imparting material is used, electric contact between the electrode active materials can be improved, and in particular, when it is used for a lithium secondary battery, discharge rate property can be improved.

As the reinforcement material, e.g., a variety of inorganic or organic fillers in a spherical shape, a plate shape, a rod shape, or a fiber shape may be used. The amount of each of the conductivity-imparting material and the reinforcement agent is usually 0 parts by weight or more and preferably 1 part by weight or more, and usually 20 parts by weight or less and preferably 10 parts by weight or less, relative to 100 parts by weight of the electrode active material.

(Mixture Slurry)

The electrode material layer is usually produced by attaching a slurry (this may be referred to hereinbelow as "mixture slurry") containing an electrode active material, a binding agent for an electrode material layer, and a solvent, and if necessary, an optional component to the current collector.

The mixture slurry usually contains a solvent for dissolving or dispersing the electrode active material, the binding agent for an electrode material layer, the optional component, etc. When a substance capable of dissolving the binding agent for an electrode material layer is used as the solvent, the electrode active material and the conductivity-imparting material can be finely dispersed, and therefore this is preferable. It is deduced that when the binding agent for an electrode material layer is used in a state of being dissolved in the solvent, the binding agent for an electrode material layer is adsorbed on a surface of the electrode active material, etc. to stabilize the dispersion by its volume effect.

As the solvent for use in the mixture slurry, either water or an organic solvent may be used. Examples of the organic solvent may include cyclic aliphatic hydrocarbons such as cyclopentane and cyclohexane; aromatic hydrocarbons such as toluene and xylene; ketones such as ethyl methyl ketone and cyclohexanone; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene gylcol monomethyl ether; and amides such as N-methylpyrrolidone and N,N-dimethylformamide. As the solvent, one type thereof may be solely used, or two or more thereof may be used in combination at any ratio. It is preferable that the specific type of solvent is appropriately selected from the viewpoints of drying speed and environmental matters. In particular, it is preferable to use a non-aqueous solvent from the viewpoint of electrode swelling property to water.

For example, the mixture slurry may further contain an additive that exerts a variety of functions, such as a thickener. As the thickener, a polymer soluble in the solvent that is used for the mixture slurry is usually used. Specific examples thereof may include an acrylonitrile-butadiene copolymer hydride.

Further, in order to enhance the stability and the lifetime of the battery, the mixture slurry may contain, e.g., trifluoropropylene carbonate, vinylene carbonate, catechol carbonate, 1,6-dioxaspiro[4,4]nonane-2,7-dione, and 12-crown-4-ether. Further, these may be contained in an electrolytic solution.

It is preferable that the amount of the solvent in the mixture slurry is adjusted in accordance with types of the electrode active material and the binding agent for an electrode material layer such that the viscosity of the mixture slurry is suitable for coating. Specifically, the amount of the solvent is adjusted for use so that the concentration of the solid content that is the total amount of the electrode active material, the binding agent for an electrode material layer, and the optional component is preferably 30% by weight or more and more preferably 40% by weight or more, and preferably 90% by weight or less and more preferably 80% by weight or less.

The mixture slurry is obtained by mixing the electrode active material, the binding agent for an electrode material layer, the solvent, and if necessary, the optional component, using a mixer. In the mixing, the respective components may be supplied at a time to the mixer and mixed. When the electrode active material, the binding agent for an electrode material layer, the conductivity-imparting material, and the thickener are used as components of the mixture slurry, it is preferable that the conductivity-imparting material and the thickener are mixed in the solvent so as to disperse the conductivity-imparting material in a fine particle shape, and the binding agent for an electrode material layer and the electrode active material are then mixed, since thereby the dispersibility of the slurry is improved. As the mixer, a ball mill, a sand mill, a pigment disperser, a grinder, an ultrasonic disperser, a homogenizer, a planetary mixer, a Hobart mixer, etc., may be used. In particular, a ball mill is preferably used since coagulation of the conductivity-imparting material and the electrode active material can be suppressed.

The size (particle size) of particles contained in the mixture slurry is preferably 35 μm or smaller, and more preferably 25 μm or smaller. When the particle size of the slurry falls within the range, a uniform electrode material layer having high dispersibility of the conductive-imparting material can be obtained.

(Method for Producing Electrode Material Layer)

For example, the electrode material layer may be produced by bonding the electrode material layer in the form of layers to at least one surface, and preferably both surfaces, of the current collector. Specifically, the electrode material layer may be produced by applying the mixture slurry onto the current collector followed by drying, and then heat-treating the slurry at 120° C. or higher for 1 hour or more.

Examples of the method for applying the mixture slurry onto the current collector may include a doctor-blade method, a dip method, a reverse roll method, a direct roll method, a gravure method, an extrusion method, and a brush method. Examples of the drying method may include methods including drying by warm air, hot air, or low humid air; vacuum drying; and a drying method by irradiation with energy beam such as infrared ray, far infrared ray, and electron beam.

Subsequently, it is preferable that the electrode material layer is subjected to pressurization treatment using a metal mold press, roll press, etc. By performing pressurization treatment, the porosity of the electrode material layer can be decreased. The porosity of the electrode material layer is preferably 5% or more and more preferably 7% or more, and preferably 15% or less and more preferably 13% or less. When the porosity is equal to or more than the lower limit of the range, the volumetric capacity can be increased, and removal of the electrode material layer can be prevented. When the porosity is equal to or less than the upper limit of the range, charging efficiency and discharge efficiency can be enhanced.

When a curable polymer is used as the binding agent for an electrode material layer, it is preferable that the binding agent for an electrode material layer is cured at an appropriate time after the application of the mixture slurry.

In the positive electrode and the negative electrode, the thickness of the electrode material layer is usually 5 μm or more and preferably 10 μm or more, and usually 300 μm or less and preferably 250 μm or less.

[2.3. Porous Membrane]

The electrode of the present invention has the porous membrane of the present invention on the electrode material layer. By having such a feature, removal of the electrode active material, etc. from the electrode material layer, removal of the electrode material layer, internal short circuit of the battery, etc. can be prevented.

As the method for providing the porous membrane of the present invention on the electrode material layer, the method for producing a porous membrane of the present invention may be performed, e.g., using the electrode material layer as the substrate. Specific examples of the method may include:

1) a method wherein a slurry for a porous membrane is applied onto the surface of the electrode material layer, and then dried;

2) a method wherein the electrode material layer is immersed in a slurry for a porous membrane, and then dried; and 3) a method wherein a slurry for a porous membrane is applied onto a release film and then dried to produce the porous membrane of the present invention, and the resulting porous membrane of the present invention is transferred to the surface of the electrode material layer.

Among them, the method 1) is particularly preferable since the film thickness of the porous membrane of the present invention can be easily controlled.

[2.4. Other Components]

The electrode of the present invention may have components other than the current collector, the electrode material layer, and the porous membrane of the present invention as long as the effects of the present invention are not significantly impaired. For example, if necessary, another layer may be provided between the electrode material layer and the porous membrane of the present invention. In this case, the porous membrane of the present invention may be indirectly provided on the electrode material layer. Further, still another layer may be provided on the porous membrane of the present invention.

[3. Separator for Secondary Battery]

The separator of the present invention (separator for a secondary battery) has an organic separator and the porous membrane of the present invention that is formed on the organic separator. Even when the separator of the present invention has the porous membrane of the present invention, an electrolytic solution can permeate the porous membrane of the present invention. Therefore, such a structure does not adversely affect the rate property. Further, since the porous membrane of the present invention is provided, the separator of the present invention has low tendency to cause blocking.

The organic separator is generally a member provided between a positive electrode and a negative electrode to prevent short circuit of the electrodes. As the organic separator, e.g., a porous substrate having fine pores is used, and a porous substrate made of an organic material is usually used. Specific examples of the organic separator may include a microporous membrane or a non-woven fabric that contains a polyolefin resin such as polyethylene and polypropylene, and an aromatic polyamide resin.

The thickness of the organic separator is usually 0.5 μm or more and preferably 1 μm or more, and usually 40 μm or less, preferably 30 μm or less, and more preferably 10 μm or less. When the thickness falls within this range, resistance caused by the separator of the present invention in the battery decreases, and the workability during production of the battery is improved.

The separator of the present invention has the porous membrane of the present invention on the organic separator. As the method for providing the porous membrane of the present invention to the organic separator, e.g., the method for producing a porous membrane of the present invention may be performed using the organic separator as the substrate. Specific examples of the method may include:

1) a method wherein a slurry for a porous membrane is applied onto the surface of the organic separator, and then dried;

2) a method wherein the organic separator is immersed in a slurry for a porous membrane, and then dried; and 3) a method wherein a slurry for a porous membrane is applied onto a release film and then dried to produce the porous membrane of the present invention, and the resulting porous membrane of the present invention is transferred to the surface of the organic separator.

Among them, the method 1) is particularly preferable since the film thickness of the porous membrane of the present invention can be easily controlled.

The separator of the present invention may include components other than the organic separator and the porous membrane of the present invention as long as the effects of the present invention are not significantly impaired. For example, another layer may be provided on the porous membrane of the present invention.

[4. Secondary Battery]

The secondary battery of the present invention has a positive electrode, a negative electrode, a separator, and an electrolytic solution. In the secondary battery of the present invention, at least one of a positive electrode, a negative electrode, and a separator has the porous membrane of the present invention. That is, the secondary battery of the present invention satisfies one or both of the following requirements (A) and (B).

(A) The battery has the electrode of the present invention as at least one of a positive electrode and a negative electrode.

(B) The battery has the separator of the present invention as a separator.

The porous membrane of the present invention has excellent adhesion property and anti-powder falling property. Therefore, even when the secondary battery of the present invention is repeatedly charged and discharged, the porous membrane is unlikely to be removed from the electrode material layer and the organic separator. Accordingly, the secondary battery of the present invention has excellent cycle property.

In addition, since pores are unlikely to be occluded even under a high temperature environment in the porous membrane of the present invention, the secondary battery of the present invention has excellent rate property.

[4.1. Electrode]

Basically, the secondary battery of the present invention has the electrode of the present invention as one or both of the positive electrode and the negative electrode. However, when the secondary battery of the present invention has the separator of the present invention as the separator, the secondary battery of the present invention may have electrodes other than the electrode of the present invention as both the positive electrode and the negative electrode.

[4.2. Separator]

Basically, the secondary battery of the present invention has the separator of the present invention as the separator. However, when the secondary battery of the present invention has the electrode of the present invention as one or both of the positive electrode and the negative electrode, the secondary battery of the present invention may have a separator other than the separator of the present invention as the separator.

[4.3. Electrolytic Solution]

As an electrolytic solution, an organic electrolytic solution in which a supporting electrolyte is dissolved in an organic solvent is usually used. As the supporting electrolyte, e.g., a lithium salt is used. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among them, $LiPF_6$, $LiClO_4$, and $CF_3SO_3Li$ are preferable since they are easily soluble in a solvent and show a high dissociation degree. As the electrolyte, one type thereof may be solely used, or two or more thereof may be used in combination at any ratio. Use of a supporting electrolyte having high dissociation degree usually tends to increase the lithium ion conductivity. Therefore, the lithium ion conductivity can be adjusted by selecting the type of supporting electrolyte.

The organic solvent used in the electrolytic solution is not particularly limited as long as the supporting electrolyte can be dissolved therein. Examples of the suitable organic solvent may include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Further, a mixed liquid of these solvents may also be used. In particular, carbonates are preferable since they have a high dielectric constant and a wide stable potential region. As the viscosity of the used solvent is lower, the lithium ion conductivity usually tends to be higher. Therefore, the lithium ion conductivity can be adjusted by selecting the type of the solvent.

The concentration of the supporting electrolyte in the electrolytic solution is usually 1% by weight or more and preferably 5% by weight or more, and usually 30% by weight or less and preferably 20% by weight or less. The supporting electrolyte may also be used in a concentration of usually 0.5 mol/L to 2.5 mol/L depending on the type of the supporting electrolyte. When the concentration of the supporting electrolyte is too low or too high, the ion conductivity tends to decrease. Usually, as the concentration of the electrolyte is lower, the swelling degree of polymer particles as a binding agent for an electrode material layer increases. Therefore, the lithium ion conductivity can be adjusted by adjusting the concentration of the electrolytic solution.

If necessary, the electrolytic solution may further contain an additive, etc.

[4.4. Method for Producing Secondary Battery]

Examples of the method for producing the secondary battery of the present invention may include the following method.

A positive electrode and a negative electrode are firstly stacked with a separator interposed therebetween. Thereby a layered body including the positive electrode, the separator, and the negative electrode in this order is obtained. The layered body has the porous membrane of the present invention between the electrode material layer and the organic separator.

Subsequently, the layered body is subjected to heat pressing treatment. By the heat pressing treatment, the polymer forming the core portion of the non-conductive particles in the porous membrane of the present invention is melted and the shell portion is broken. From the broken shell portion, the polymer forming the core portion flows out. Through the polymer, the electrode material layer and the organic separator are strongly bonded to the porous membrane of the present invention.

The temperature for heat pressing treatment is usually equal to or higher than the glass transition point of the core portion and equal to or lower than the glass transition point of the shell portion. Specifically, the temperature is preferably 60° C. or higher, more preferably 70° C. or higher, and particularly preferably 80° C. or higher, and preferably 110° C. or lower, more preferably 105° C. or lower, and particularly preferably 100° C. or lower.

The pressure for heat pressing treatment is usually 0.1 MPa or more, preferably 0.3 MPa or more, and more preferably 0.5 MPa or more, and usually 10 MPa or less, preferably 5 MPa or less, and more preferably 3 MPa or less. When the pressure of heat pressing is equal to or more than the lower limit of the range, the electrode material layer and the organic separator can be strongly bonded to each other. When the pressure is equal to or less than the upper limit, the porous property of the organic separator can be maintained.

The Time for heat pressing is usually 2 seconds or more, preferably 5 seconds or more, and more preferably 8 seconds or more, and usually 60 seconds or less, preferably 40 seconds or less, and more preferably 20 seconds or less. When the time for heat pressing is equal to or more than the lower limit of the range, the electrode material layer and the organic separator can be strongly bonded to each other. When the time is equal to or less than the upper limit, high productivity can be ensured.

Subsequently, the obtained layered body is wound or folded in conformity with the shape of a battery and then inserted into a battery container. The battery container is filled with the electrolytic solution and then sealed. As a result, the secondary battery of the present invention is obtained.

If necessary, an over-current protective element such as a fuse and a PTC element, a lead plate, expanded metal, etc. may be put into the container to prevent overcharging and overdischarging and an increase in the pressure inside the battery. The shape of the battery may be any of a coin type, a button type, a sheet type, a cylindrical type, a square type, and a flat type.

EXAMPLES

The present invention will be specifically described hereinbelow with reference to Examples. However, the present invention is not limited to the following Examples. The present invention may be optionally modified without departing from the scopes of claims of the present invention and equivalents thereof. Unless otherwise stated, "%" and "part" that represent an amount in the following description are based on weight. Unless otherwise stated, the following operations are performed under conditions of normal temperature and normal pressure.

[Evaluation Method]

[Method for Calculating Number Average Particle Diameter]

From a photograph taken at a magnification of 25,000 with a field emission scanning electron microscope ("Hitachi S-4700" manufactured by Hitachi High-Technologies Corporation), 200 particles were randomly selected. The particle diameter was determined as (La+Lb)/2 wherein La is the longest side of particle images and Lb is the shortest side. The average particle diameter was calculated from the average of 200 particles.

[Method for Calculating Glass Transition Point (Tg)]

10 mg of a weighed sample for measurement was put into an aluminum pan. The DSC curve thereof was determined with a differential thermal analysis device ("EXSTAR DSC6220" manufactured by SII NanoTechnology Inc.) using an empty aluminum pan as a reference at a measurement temperature range of −100° C. to 500° C. and a temperature increasing rate of 10° C./min under normal temperature and normal humidity with nitrogen atmosphere. During the heating process, the intersection of a base line immediately before an endothermic peak of the DSC curve in which the differential signal (DDSC) was 0.05 mW/min/mg or more and a tangent line of the DSC curve at an inflection point that appeared for the first time after the endothermic peak was determined as the glass transition point (Tg).

[Method for Calculating Thickness of Shell Portion of Non-Conductive Particles]

The number average particle diameter (D1) of core particles before formation of the shell portion and the number average particle diameter (D2) of the non-conductive particles after formation of the shell portion were measured. The thickness (S) of shell portion of non-conductive particles was calculated from the following expression.

$(D2-D1)/2=S$

[Powder Falling Test for Separator for Secondary Battery and Electrode for Secondary Battery]

A separator with a porous membrane and an electrode with a porous membrane were punched by a punching machine to have samples in a circular shape with a diameter of 19 mm. The presence or absence of porous membrane pieces attached on a punching blade was visually observed, and judged in accordance with the following criteria. Delay in occurrence of the attachment of the porous membrane pieces on the punching blade is indicative of good powder falling property of the porous membrane layer formed on the electrode material layer or the organic separator. The presence or absence of attached porous membrane pieces was observed every 100 punches up to 1,000 punches.

(Evaluation Criteria)

A: Attachment of porous membrane pieces do not appear even at the 1,000th punch.

B: Attachment of porous membrane pieces appear at the 501th to 999th punches.

C: Attachment of porous membrane pieces appear at the 101th to 500th punches.

D: Attachment of porous membrane pieces appear at the 100th or less punch.

[Blocking Test for Separator for Secondary Battery and Electrode for Secondary Battery]

An electrode with a porous membrane or a separator with a porous membrane was cut into 5 cm in width×5 cm in length, to obtain test pieces. Two test pieces were layered and pressed under conditions of 60° C., 1 hour, and 1 MPa. The adhesion state of the electrode with a porous membrane or the separator with a porous membrane (blocking state) was visually observed.

In the blocking test for the electrode with a porous membrane, the test pieces were layered so that the porous membranes of the electrodes with a porous membrane were in contact with each other.

(Evaluation Criteria)

A: Test pieces are not bonded

B: Test pieces are lightly bonded, but removed even when they are touched with the hand C: Test pieces are lightly bonded, but easily removed D: Test pieces are bonded

[Electrode Adhesion Test for Separator for Secondary Battery]

A separator with a porous membrane was cut into 5 cm in width×5 cm in length, and a positive electrode and a negative electrode were cut into 3 cm in width×3 cm in length, to obtain test pieces. The separator with a porous membrane was placed on the surface of the positive electrode on the positive electrode material layer side. Then the negative electrode was placed on the separator so that the surface of the negative electrode on the negative electrode material layer side opposed to the separator. The layered body was subjected to heat pressing treatment with a bench top test press apparatus under conditions of a temperature of 90° C., a time of 10 seconds, and a pressure of 1 MPa. Each electrode was then removed from the layered body at a rate of 50 mm/sec and an angle of 90°. After the removal, the ratio (R1) of an electrode material layer that remained in adhering state on the separator with a porous membrane was calculated from the following expression. The adhesion property of the separator with a porous membrane to the electrode was thus evaluated. Higher value of this ratio is indicative of better adhesion property.

(R1)=(area of electrode material layer remained in adhering state on separator with porous membrane/area of used electrode material layer)×100

(Evaluation Criteria)

A: 70% or more

B: 50% or more, and less than 70%

C: 30% or more, and less than 50%

D: less than 30%

[Separator Adhesion Test for Electrode for Secondary Battery]

An organic separator was cut into 5 cm in width×5 cm in length, and a positive electrode with a porous membrane and a negative electrode with a porous membrane were cut into 3 cm in width×3 cm in length, to obtain test pieces. The organic separator was placed on the surface of the positive electrode with a porous membrane on the porous membrane layer side. Then the negative electrode with a porous membrane was placed on the organic separator so that the surface of the negative electrode on a porous membrane layer side opposed to the organic separator. The layered body was subjected to heat pressing treatment with a bench top test press apparatus under conditions of a temperature of 90° C., a time of 10 seconds, and a pressure of 1 MPa. Each electrode was then removed from the layered body at a rate of 50 mm/sec and an angle of 90°. After the removal, the ratio (R2) of an electrode material layer that remained in adhering state on the organic separator was calculated from the following expression. The adhesion property of the electrode with a porous membrane to the separator was thus evaluated. Higher value of this ratio is indicative of better adhesion property.

($R2$)=(area of electrode material layer with porous membrane remained in adhering state on organic separator/area of used electrode material layer)×100

(Evaluation Criteria)
A: 70% or more
B: 50% or more, and less than 70%
C: 30% or more, and less than 50%
D: less than 30%

[Test for Evaluating Rate Property of Secondary Battery]

A laminate-type lithium ion secondary battery was left to stand for 24 hours, and then subjected to a charging/discharging operation in which the battery was charged to 4.2 V and discharged to 3.0 V at 25° C. and a charging/discharging rate was 0.1 C. After that, at 25° C., a charging/discharging cycle in which the battery was charged to 4.2 V at 25° C. and a charging rate of 0.1 C and discharged to 3.0 V at a discharging rate of 1.0 C and another charging/discharging cycle in which the battery was charged to 4.2 V and a charging rate of 0.1 C and discharged to 3.0 V at a discharging rate of 3.0 C were each performed. The ratio of the battery capacity in 3.0 C with respect to the battery capacity in 1.0 C was calculated in percentage, to determine the charging/discharging rate property. The ratio was judged in accordance with the following criteria. Higher value of this ratio is indicative of smaller internal resistance, which enables charging and discharging at a high speed.

(Evaluation Criteria)
A: 70% or more
B: 65% or more, and less than 70%
C: 60% or more, and less than 65%
D: less than 60%

[Test for Evaluating High-Temperature Cycle Property of Secondary Battery]

A laminate-type lithium ion secondary battery was left to stand for 24 hours, and then subjected to a charging/discharging operation at 25° C. in which the battery was charged to 4.2 V and a charging/discharging rate was 0.1 C, to measure the initial capacity C0. Further, under an environment of 60° C., the battery was charged to 4.2 V and discharged to 3.0 V at a charging/discharging rate of 0.1 C. The charging and discharging were repeated in cycles, and the capacity C1 after 100 cycles was measured. The high-temperature cycle property were evaluated on the basis of the capacity keeping ratio represented by $\Delta C = C1/C0 \times 100$ (%). Higher value of this ratio is indicative of smaller decrease in the discharging capacity, and better cycle property.

(Evaluation Criteria)
A: 82% or more
B: 77% or more, and less than 82%
C: 72% or more, and less than 77%
D: less than 72%

Example 1

(1-1. Production of Seed Polymer Particles A1)

0.074 parts of sodium dodecylsulfate, 0.23 parts of ammonium persulfate, and 100 parts of ion exchanged water were placed in a reactor vessel equipped with a stirrer, and mixed to prepare a composition A1. The composition A1 was heated to 80° C.

Separately, 93.8 parts of butyl acrylate, 2.0 parts of methacrylic acid, 2.0 parts of acrylonitrile, 1.0 part of allyl glycidyl ether, 1.2 parts of N-methylolacrylamide, 0.1 parts of sodium dodecylsulfate, and 100 parts of ion exchanged water were mixed in another vessel to prepare a dispersion of monomer mixture A1.

The dispersion of monomer mixture A1 was continuously added to the composition A1 over 4 hours, to perform polymerization. The temperature in the reaction system during continuous addition of the dispersion of monomer mixture A1 was maintained to 80° C. for performing the reaction. After completion of the continuous addition, the reaction was further continued at 90° C. for 3 hours.

As a result, an aqueous dispersion of seed polymer particles A1 with a number average particle diameter of 292 nm was obtained.

(1-2. Production of Non-Conductive Particles A1)

Subsequently, 10 parts based on a solid content (i.e., based on the weight of the seed polymer particles A1) of aqueous dispersion of seed polymer particles A1 obtained in the step (1-1), 70 parts of styrene and 30 parts of butyl acrylate as monomers, 1.0 part of sodium dodecylbenzenesulfonate as an emulsifier, 4.0 parts of tert-butylperoxy-2-ethyl hexanoate ("PERBUTYL 0" available from NOF Corporation) as a polymerization initiator, and 200 parts of ion exchanged water were placed in a reactor vessel equipped with a stirrer. This mixture was stirred at 35° C. for 12 hours. As a result, the monomer and the polymerization initiator were completely absorbed by the seed polymer particles A1. After that, a reaction was performed at 90° C. for 5 hours. As a result, an aqueous dispersion of core particles A1 that were grown seed polymer particles was obtained. The number average particle diameter of the core particles A1 was 644 nm.

While the temperature in the reaction system was maintained to 90° C., an aqueous solution in which 3.0 parts of methyl methacrylate as a monomer for forming a shell portion, and 0.1 parts of 2,2'-azobis(2-methyl-N-(2-hydroxyethyl)-propionamide) ("VA086" available from Wako Pure Chemical Industries, Ltd.) as a polymerization initiator for forming a shell portion were dissolved in 10 parts of ion exchanged water was added, to continue the reaction at 90° C. for 3 hours. After that, steam was introduced to remove an unreacted monomer and a degradation product of the initiator.

As a result, an aqueous dispersion of non-conductive particles A1 having a core-shell structure with a number average particle diameter of 650 nm was obtained.

(1-3. Production of Binder for Porous membrane B1)

0.06 parts of sodium dodecylsulfate, 0.23 parts of ammonium persulfate, and 100 parts of ion exchanged water were placed in a reactor vessel equipped with a stirrer, and mixed to prepare a composition B1. The composition B1 was heated to 80° C.

Separately, 83.8 parts of butyl acrylate, 2.0 parts of methacrylic acid, 12.0 parts of acrylonitrile, 1.0 part of allyl glycidyl ether, 1.2 parts of N-methylolacrylamide, 0.1 parts of sodium dodecylsulfate, and 100 parts of ion exchanged water were mixed in another vessel to prepare a dispersion of monomer mixture B1.

This dispersion of monomer mixture B1 was continuously added to the composition B1 obtained in the aforementioned procedure over 4 hours, to perform polymerization. The temperature in the reaction system during continuous addition of the dispersion of monomer mixture B1 was maintained to 80° C. for performing the reaction. After completion of the continuous addition, the reaction was further continued at 90° C. for 3 hours. As a result, an aqueous dispersion of a binder for a porous membrane was obtained.

The obtained aqueous dispersion of the binder for a porous membrane was cooled to 25° C. To this aqueous dispersion, ammonia water was added to adjust the pH to 7. After that, steam was introduced to remove an unreacted monomer. Subsequently, while the solid content concentration was further adjusted with ion-exchanged water, filtration was performed using a 200-mesh (pore size: about 77 µm) stainless screen. As a result, an aqueous dispersion of a binder for a porous membrane B1 in a particle shape with a number average particle diameter of 370 nm and a solid content concentration of 40% was obtained.

(1-4. Production of Slurry for Porous Membrane)

The aqueous dispersion of non-conductive particles A1 obtained in the step (1-2), the aqueous dispersion of the binder for a porous membrane obtained in the step (1-3), carboxymethyl cellulose ("DAICEL1220" available from Daicel Corporation) as a viscosity modifier, and a wetting agent ("SN-WET 980" available from SAN NOPCO LIMITED) were mixed in water so that the solid content weight ratio was 82:12:5:1, to obtain a slurry for a porous membrane having a solid content concentration of 20%.

(1-5. Production of Separator for Secondary Battery (Separator with Porous Membrane))

A single layer polyethylene separator (thickness: 16 µm) produced by a wet process was prepared as an organic separator. Onto one surface of the organic separator, the slurry for a secondary battery obtained in the step (1-4) was applied so that the dried thickness was 2 µm, to obtain a slurry layer. The slurry layer was then dried at 50° C. for 10 minutes to form a porous membrane. Subsequently, a porous membrane was similarly formed on another surface of the organic separator to obtain a separator with a porous membrane on both surfaces.

(1-6. Production of Positive Electrode)

95 parts of $LiCoO_2$ as a positive electrode active material was prepared. To this material, PVDF (poly(vinylidene fluoride); "KF-1100" available from KUREHA CORPORATION) as a binding agent for a positive electrode was added so that the amount thereof was 3 parts in terms of solid content, and 2 parts of acetylene black and 20 parts of N-methylpyrrolidone were further added. The mixture was mixed with a planetary mixer to obtain a slurry for a positive electrode. The slurry for a positive electrode was applied onto one surface of aluminum foil having a thickness of 18 µm and dried at 120° C. for 3 hours. The resultant was roll-pressed to obtain a positive electrode having a positive electrode material layer with an entire thickness of 100 µm.

(1-7. Production of Negative Electrode)

98 parts of graphite having a particle diameter of 20 µm and a specific surface area of 4.2 $m^2/g$ was prepared as a negative electrode active material. 1 part in terms of solid content of SBR (styrene-butadiene rubber, glass transition point: −10° C.) as a binding agent for a negative electrode was mixed therewith. To the mixture, 1.0 part of carboxymethyl cellulose was further added, and this mixture was mixed with a planetary mixer, to prepare a slurry for a negative electrode. The slurry for a negative electrode was applied onto one surface of copper foil having a thickness of 18 µm and dried at 120° C. for 3 hours. The resultant was then roll-pressed to obtain a negative electrode having a negative electrode material layer with an entire thickness of 100 µm.

(1-8. Production of Secondary Battery)

The positive electrode obtained in the step (1-6) was cut into 40 mm in width×40 mm in length to obtain a square positive electrode. The negative electrode obtained in the step (1-7) was cut into 42 mm in width×42 mm in length to obtain a square negative electrode. The separator with a porous membrane obtained in the step (1-5) was cut into a 46 mm in width×46 mm in length to obtain a square separator with a porous membrane.

The square separator with a porous membrane was placed on the surface of the square positive electrode on the positive electrode material layer side. The square negative electrode was placed on the separator with a porous membrane so that the surface of the negative electrode on the negative electrode material layer side opposed to the separator with a porous membrane. The layered body was subjected to heat pressing treatment with a bench top test press apparatus under conditions of a temperature of 90° C., a time of 10 seconds, and a pressure of 1 MPa, to obtain a layered body in which the separator with a porous membrane was bonded to the positive electrode and the negative electrode and integrated.

The layered body was placed on an aluminum packing material. An electrolytic solution was poured into the aluminum packing material such that no air remains therein. Further, heat sealing at 150° C. was performed to seal the opening of the aluminum packing material. Thus, a laminate-type lithium ion secondary battery was produced. As the electrolytic solution, a solution in which 2% by volume of VC (vinylene carbonate) was added to a $LiPF_6$ solution at a concentration of 1.0 M was used. The solvent of the $LiPF_6$ solution was a mixed solvent of ethylene carbonate (EC) and diethyl carbonate (DEC) (EC/DEC=½ by volume).

(1-9. Evaluation)

The resulting separator with a porous membrane was subjected to powder falling test, blocking test, and adhesion test to an electrode. The obtained secondary battery was subjected to evaluation tests for rate property and high-temperature cycle property.

Example 2

A separator with a porous membrane and a secondary battery were produced and evaluated in the same manner as in Example 1 except that the amount of styrene was changed to 63 parts and the amount of butyl acrylate was changed to 37 parts during production of core particles in the step (1-2).

Example 3

A separator with a porous membrane and a secondary battery were produced and evaluated in the same manner as in Example 1 except that the amount of styrene was changed to 79 parts and the amount of butyl acrylate was changed to 21 parts during production of core particles, and 1.8 parts of methyl methacrylate and 1.2 parts of methacrylic acid were used as monomers for forming a shell portion during formation of the shell portion in the step (1-2).

Example 4

A separator with a porous membrane and a secondary battery were produced and evaluated in the same manner as in Example 1 except that 2.8 parts of methyl methacrylate and 0.2 parts of butyl acrylate were used as monomers for forming a shell portion during formation of the shell portion in the step (1-2).

Example 5

A separator with a porous membrane and a secondary battery were produced and evaluated in the same manner as in Example 1 except that the amount of methyl methacrylate was changed to 0.47 parts during formation of a shell portion in the step (1-2).

Example 6

A separator with a porous membrane and a secondary battery were produced and evaluated in the same manner as in Example 1 except that the amount of methyl methacrylate was changed to 5.0 parts during formation of a shell portion in the step (1-2).

Example 7

A separator with a porous membrane and a secondary battery were produced and evaluated in the same manner as in Example 1 except that the amount of styrene was changed to 58 parts and the amount of butyl acrylate was changed to 42 parts during production of core particles in the step (1-2).

Example 8

A separator with a porous membrane and a secondary battery were produced and evaluated in the same manner as in Example 1 except that the amount of styrene was changed to 87 parts and the amount of butyl acrylate was changed to 13 parts during production of core particles, and 1.8 parts of methyl methacrylate and 1.2 parts of methacrylic acid were used as monomers for forming a shell portion during formation of the shell portion in the step (1-2).

Example 9

A separator with a porous membrane and a secondary battery were produced and evaluated in the same manner as in Example 1 except that 2.55 parts of methyl methacrylate and 0.45 parts of butyl acrylate were used as monomers for forming a shell portion during formation of the shell portion in the step (1-2).

Example 10

A separator with a porous membrane and a secondary battery were produced and evaluated in the same manner as in Example 1 except that the amount of methyl methacrylate was changed to 0.12 parts during formation of a shell portion in the step (1-2).

Example 11

A separator with a porous membrane and a secondary battery were produced and evaluated in the same manner as in Example 1 except that the amount of methyl methacrylate was changed to 19.0 parts during formation of a shell portion in the step (1-2).

Example 12

A separator with a porous membrane and a secondary battery were produced and evaluated in the same manner as in Example 1 except that 3.0 parts of styrene was used in place of methyl methacrylate as a monomer for forming a shell portion during formation of the shell portion in the step (1-2).

Example 13

0.06 parts of sodium dodecylsulfate, 0.23 parts of ammonium persulfate, and 100 parts of ion exchanged water were placed in a reactor vessel equipped with a stirrer, and mixed to prepare a composition B13. The composition B13 was heated to 80° C.

Separately, 22.0 parts of styrene, 64.0 parts of butadiene, 2.0 parts of methacrylic acid, 12.0 parts of acrylonitrile, 1.0 part of allyl glycidyl ether, 1.2 parts of N-methylolacrylamide, 0.1 parts of sodium dodecylsulfate, and 100 parts of ion exchanged water were mixed in another vessel to prepare a dispersion of monomer mixture B13.

This dispersion of monomer mixture B13 was continuously added to the composition B13 obtained in the aforementioned procedure over 4 hours, to perform polymerization. The temperature in the reaction system during continuous addition of the dispersion of monomer mixture B13 was maintained to 80° C. for performing the reaction. After completion of the continuous addition, the reaction was continued at 90° C. for 3 hours. As a result, an aqueous dispersion of a binder for a porous membrane was obtained.

The obtained aqueous dispersion of the binder for a porous membrane was cooled to 25° C. To this aqueous dispersion, ammonia water was added to adjust the pH to 7. After that, steam was introduced to remove an unreacted monomer. Subsequently, while the solid content concentration was further adjusted with ion-exchanged water, filtration was performed using a 200-mesh (pore size: about 77 μm) stainless screen. As a result, an aqueous dispersion of a binder for a porous membrane B13 in a particle shape with a number average particle diameter of 370 nm and a solid content concentration of 40% was obtained.

A separator with a porous membrane and a secondary battery were produced and evaluated in the same manner as in Example 1 except that the aqueous dispersion of the binder for a porous membrane B13 produced in this Example was used in place of the aqueous dispersion of the binder for a porous membrane B1.

Example 14

(14-1. Production of Positive Electrode with Porous Membrane)

The slurry for a porous membrane obtained in the step (1-4) of Example 1 was applied onto a surface of the positive electrode obtained in the step (1-6) of Example 1 on the positive electrode material layer side so that the thickness of dried porous membrane was 2 μm, to obtain a slurry layer. In this process, the slurry for a porous membrane was applied so that the positive electrode material layer was completely covered. After that, the slurry layer was dried at 50° C. for 10 minutes to form a porous membrane. Thus, a positive electrode with a porous membrane was obtained. The resulting positive electrode with a porous membrane had a layer structure of (porous membrane)/(positive electrode material layer)/(aluminum foil).

(14-2. Production of Negative Electrode with Porous Membrane)

The slurry for a porous membrane obtained in the step (1-4) of Example 1 was applied onto a surface of the negative electrode obtained in the step (1-7) of Example 1 on the negative electrode material layer side so that the thickness of dried porous membrane was 2 μm, to obtain a slurry layer. At this time, the slurry for a porous membrane was applied so that the negative electrode material layer was completely covered. After that, the slurry layer was dried at 50° C. for 10 minutes to form a porous membrane. Thus, a negative electrode with a porous membrane was obtained. The resulting negative electrode with a porous membrane had a layer structure of (porous membrane)/(negative electrode material layer)/(copper foil).

(14-3. Production and Evaluation of Secondary Battery and the Like)

A secondary battery was produced by the same operation as in the step (1-8) of Example 1 except for the changes of the following items i. to iv.

i. In place of the separator with a porous membrane, an organic separator (single layer polyethylene separator produced by a wet process, thickness: 16 μm) as it was used.

ii. In place of the positive electrode, the positive electrode with a porous membrane obtained in the step (14-1) was used.

iii. In place of the negative electrode, the negative electrode with a porous membrane obtained in the step (14-2) was used.

iv. The organic separator was placed on the surface of the positive electrode with a porous membrane on a porous membrane layer side. Further, the negative electrode with a porous membrane was placed on the organic separator so that the surface of the negative electrode on the porous membrane layer side opposed to the organic separator.

The obtained secondary battery and other materials were evaluated in the same manner as in Example 1.

Example 15

A separator with a porous membrane and a secondary battery were produced and evaluated in the same manner as in Example 1 except that the amount of methyl methacrylate was changed to 1.28 parts during formation of a shell portion in the step (1-2).

Comparative Example 1

A separator with a porous membrane and a secondary battery were produced and evaluated in the same manner as in Example 1 except that the amount of styrene was changed to 52 parts and the amount of butyl acrylate was changed to 48 parts during production of core particles in the step (1-2).

Comparative Example 2

A separator with a porous membrane and a secondary battery were produced and evaluated in the same manner as in Example 1 except that the amount of styrene was changed to 92 parts and the amount of butyl acrylate was changed to 8 parts during production of core particles, and 1.8 parts of methyl methacrylate and 1.2 parts of methacrylic acid were used as monomers for forming a shell portion during formation of the shell portion in the step (1-2).

Comparative Example 3

A separator with a porous membrane and a secondary battery were produced and evaluated in the same manner as in Example 1 except that 2.46 parts of methyl methacrylate and 0.54 parts of butyl acrylate were used as monomers for forming a shell portion during formation of the shell portion in the step (1-2).

Comparative Example 4

A separator with a porous membrane and a secondary battery were produced and evaluated in the same manner as in Example 1 except that the amount of methyl methacrylate was changed to 0.03 parts during formation of a shell portion in the step (1-2).

Comparative Example 5

A separator with a porous membrane and a secondary battery were produced and evaluated in the same manner as in Example 1 except that the amount of methyl methacrylate was changed to 29 parts during formation of a shell portion in the step (1-2).

Comparative Example 6

(C6-1. Production of Seed Polymer Particles Ac6)

0.17 parts of sodium dodecylsulfate, 0.23 parts of ammonium persulfate, and 100 parts of ion exchanged water were placed in a reactor vessel equipped with a stirrer, and mixed to prepare a composition Ac6. The composition Ac6 was heated to 80° C.

Separately, 93.8 parts of butyl acrylate, 2.0 parts of methacrylic acid, 2.0 parts of acrylonitrile, 1.0 part of allyl glycidyl ether, 1.2 parts of N-methylolacrylamide, 0.1 parts of sodium dodecylsulfate, and 100 parts of ion exchanged water were mixed in another vessel to prepare a dispersion of monomer mixture Ac6.

The dispersion of monomer mixture Ac6 was continuously added to the composition Ac6 over 4 hours, to perform polymerization. The temperature in the reaction system during continuous addition of the dispersion of monomer mixture Ac6 was maintained to 80° C. for performing the reaction. After completion of the continuous addition, the reaction was continued at 90° C. for 3 hours.

As a result, an aqueous dispersion of seed polymer particles Ac6 with a number average particle diameter of 126 nm was obtained.

(C6-2. Production of Non-Conductive Particles Ac6)

Subsequently, 10 parts based on a solid content (i.e., based on the weight of the seed polymer particles Ac6) of aqueous dispersion of seed polymer particles Ac6 obtained in the step (C6-1), 70 parts of styrene and 30 parts of butyl acrylate as monomers, 1.0 part of sodium dodecylbenzenesulfonate as an emulsifier, 4.0 parts of tert-butylperoxy-2-ethyl hexanoate ("PERBUTYL 0" available from NOF Corporation) as a polymerization initiator, and 200 parts of ion exchanged water were put in a reactor vessel equipped with a stirrer. This mixture was stirred at 35° C. for 12 hours. As a result, the monomer and the polymerization initiator were completely absorbed by the seed polymer particles Ac6. After that, a reaction was performed at 90° C. for 5 hours. As a result, an aqueous dispersion of core particles Ac6 that were grown seed polymer particles was obtained. The number average particle diameter of the core particles Ac6 was 277 nm.

While the temperature in the reaction system was maintained to 90° C., an aqueous solution in which 3.0 parts of methyl methacrylate as a monomer for forming a shell portion, and 0.1 parts of 2,2'-azobis(2-methyl-N-(2-hydroxyethyl)-propionamide) ("VA086" available from Wako Pure Chemical Industries, Ltd.) as a polymerization initiator for forming a shell portion were dissolved in 10 parts of ion exchanged water was added, to continue the reaction at 90° C. for 3 hours. After that, steam was introduced to remove an unreacted monomer and a degradation product of the initiator.

As a result, an aqueous dispersion of non-conductive particles Ac6 having a core-shell structure with a number average particle diameter of 280 nm was obtained.

A separator with a porous membrane and a secondary battery were produced and evaluated in the same manner as in Example 1 except that the aqueous dispersion of non-conductive particles Ac6 produced in this Example was used in place of the aqueous dispersion of non-conductive particles A1.

[Results]

Tables 1 to 5 hereinbelow show configurations of Examples and Comparative Examples, and Tables 6 to 10 show results of Examples and Comparative Examples.

The meaning of each abbreviation in the Tables is as follows.

Tg: glass transition point
ΔTg: difference between glass transition point of shell portion and that of core portion
Thickness ratio: ratio of thickness of shell portion with respect to number average particle diameter of non-conductive particles
ST: styrene
BA: butyl acrylate
LASNa: sodium dodecylbenzenesulfonate
PBO: t-butylperoxy-2-ethylhexanoate
MMA: methyl methacrylate
MAA: methacrylic acid
VA-086: 2,2'-azobis(2-methyl-N-(2-hydroxyethyl)-propionamide)
(meth)acrylate ratio: ratio of (meth)acrylate unit
Sepa: separator

TABLE 1

[Constitution of Example 1 to Example 4]

| | | Ex. 1 | Ex. 2 | Ex. 3 | Ex. 4 |
|---|---|---|---|---|---|
| Non-conductive particle core | Tg | 56° C. | 42° C. | 72° C. | 56° C. |
| Non-conductive particle shell | Tg | 105° C. | 105° C. | 140° C. | 88° C. |
| Non-conductive particle shell | ΔTg | 49° C. | 63° C. | 68° C. | 32° C. |
| Non-conductive particle shell | Thickness ratio | 0.5% | 0.5% | 0.5% | 0.5% |
| Core portion | Type of seed polymer particles | A1 | A1 | A1 | A1 |
| | Amount of seed polymer particles (parts) | 10 | 10 | 10 | 10 |

TABLE 1-continued

[Constitution of Example 1 to Example 4]

| | | Ex. 1 | Ex. 2 | Ex. 3 | Ex. 4 |
|---|---|---|---|---|---|
| | ST amount (parts) | 70 | 63 | 79 | 70 |
| | BA amount (parts) | 30 | 37 | 21 | 30 |
| | LAS Na amount (parts) | 1.0 | 1.0 | 1.0 | 1.0 |
| | PBO amount (parts) | 4.0 | 4.0 | 4.0 | 4.0 |
| Shell portion | MMA amount (parts) | 3.00 | 3.00 | 1.80 | 2.80 |
| | BA amount (parts) | | | | 0.20 |
| | MAA amount (parts) | | | 1.20 | |
| | ST amount (parts) | | | | |
| | VA-086 | 0.1 | 0.1 | 0.1 | 0.1 |
| | (Meth)acrylate ratio | 100% | 100% | 60% | 100% |
| Particle diameter of non-conductive particle | | 650 nm | 651 nm | 651 nm | 653 nm |
| Binder for porous membrane | (Meth)acrylate ratio | 84% | 84% | 84% | 84% |

TABLE 2

[Constitution of Example 5 to Example 8]

| | | Ex. 5 | Ex. 6 | Ex. 7 | Ex. 8 |
|---|---|---|---|---|---|
| Non-conductive particle core | Tg | 56° C. | 56° C. | 32° C. | 86° C. |
| Non-conductive particle shell | Tg | 105° C. | 105° C. | 105° C. | 140° C. |
| Non-conductive particle shell | ΔTg | 49° C. | 49° C. | 73° C. | 54° C. |
| Non-conductive particle shell | Thickness ratio | 0.08% | 0.8% | 0.5% | 0.5% |
| Core portion | Type of seed polymer particles | A1 | A1 | A1 | A1 |
| | Amount of seed polymer particles (parts) | 10 | 10 | 10 | 10 |
| | ST amount (parts) | 70 | 70 | 58 | 87 |
| | BA amount (parts) | 30 | 30 | 42 | 13 |
| | LAS Na amount (parts) | 1.0 | 1.0 | 1.0 | 1.0 |
| | PBO amount (parts) | 4.0 | 4.0 | 4.0 | 4.0 |
| Shell portion | MMA amount (parts) | 0.47 | 5.00 | 3.00 | 1.80 |
| | BA amount (parts) | | | | |
| | MAA amount (parts) | | | | 1.20 |
| | ST amount (parts) | | | | |
| | VA-086 | 0.1 | 0.1 | 0.1 | 0.1 |
| | (Meth)acrylate ratio | 100% | 100% | 100% | 60% |
| Particle diameter of non-conductive particle | | 648 nm | 650 nm | 651 nm | 650 nm |
| Binder for porous membrane | (Meth)acrylate ratio | 84% | 84% | 84% | 84% |

TABLE 3

[Constitution of Example 9 to Example 12]

| | | Ex. 9 | Ex. 10 | Ex. 11 | Ex. 12 |
|---|---|---|---|---|---|
| Non-conductive particle core | Tg | 56° C. | 56° C. | 56° C. | 56° C. |
| Non-conductive particle shell | Tg | 68° C. | 105° C. | 105° C. | 100° C. |
| Non-conductive particle shell | ΔTg | 12° C. | 49° C. | 49° C. | 44° C. |
| Non-conductive particle shell | Thickness ratio | 0.5% | 0.02% | 2.8% | 0.5% |
| Core portion | Type of seed polymer particles | A1 | A1 | A1 | A1 |
| | Amount of seed polymer particles (parts) | 10 | 10 | 10 | 10 |
| | ST amount (parts) | 70 | 70 | 70 | 70 |
| | BA amount (parts) | 30 | 30 | 30 | 30 |
| | LAS Na amount (parts) | 1.0 | 1.0 | 1.0 | 1.0 |
| | PBO amount (parts) | 4.0 | 4.0 | 4.0 | 4.0 |
| Shell portion | MMA amount (parts) | 2.55 | 0.12 | 19.00 | |
| | BA amount (parts) | 0.45 | | | |
| | MAA amount (parts) | | | | |
| | ST amount (parts) | | | | 3.00 |
| | VA-086 | 0.1 | 0.1 | 0.1 | 0.1 |
| | (Meth)acrylate ratio | 100% | 100% | 100% | 0% |
| Particle diameter of non-conductive particle | | 649 nm | 649 nm | 680 nm | 647 nm |
| Binder for porous membrane | (Meth)acrylate ratio | 84% | 84% | 84% | 84% |

TABLE 4

[Constitution of Example 13 to Example 15, Comparative Example 1 and Comparative Example 2]

| | | Ex. 13 | Ex. 14 | Ex. 15 | Comp. Ex. 1 | Comp. Ex. 2 |
|---|---|---|---|---|---|---|
| Non-conductive particle core | Tg | 56° C. | 56° C. | 56° C. | 20° C. | 95° C. |
| Non-conductive particle shell | Tg | 105° C. | 105° C. | 105° C. | 105° C. | 140° C. |
| Non-conductive particle shell | ΔTg | 49° C. | 49° C. | 49° C. | 85° C. | 45° C. |
| Non-conductive particle shell | Thickness ratio | 0.5% | 0.5% | 0.2% | 0.5% | 0.5% |
| Core portion | Type of seed polymer particles | A1 | A1 | A1 | A1 | A1 |
| | Amount of seed polymer particles (parts) | 10 | 10 | 10 | 10 | 10 |
| | ST amount (parts) | 70 | 70 | 70 | 52 | 92 |
| | BA amount (parts) | 30 | 30 | 30 | 48 | 8 |
| | LAS Na amount (parts) | 1.0 | 1.0 | 1.0 | 1.0 | 1.0 |
| | PBO amount (parts) | 4.0 | 4.0 | 4.0 | 4.0 | 4.0 |
| Shell portion | MMA amount (parts) | 3.00 | 3.00 | 1.28 | 3.00 | 1.80 |
| | BA amount (parts) | | | | | |
| | MAA amount (parts) | | | | | 1.20 |
| | ST amount (parts) | | | | | |
| | VA-086 | 0.1 | 0.1 | 0.1 | 0.1 | 0.1 |
| | (Meth)acrylate ratio | 100% | 100% | 100% | 100% | 60% |
| Particle diameter of non-conductive particle | | 650 nm | 650 nm | 650 nm | 648 nm | 650 nm |
| Binder for porous membrane | (Meth)acrylate ratio | 0% | 84% | 84% | 84% | 84% |

TABLE 5

[Constitution of Comparative Example 3 to Comparative Example 6]

| | | Comp. Ex. 3 | Comp. Ex. 4 | Comp. Ex. 5 | Comp. Ex. 6 |
|---|---|---|---|---|---|
| Non-conductive particle core | Tg | 56° C. | 56° C. | 56° C. | 56° C. |
| Non-conductive particle shell | Tg | 62° C. | 105° C. | 105° C. | 105° C. |
| Non-conductive particle shell | ΔTg | 6° C. | 49° C. | 49° C. | 49° C. |
| Non-conductive particle shell | Thickness ratio | 0.5% | 0.005% | 4.0% | 0.5% |
| Core portion | Type of seed polymer particles | A1 | A1 | A1 | Ac6 |
| | Amount of seed polymer particles (parts) | 10 | 10 | 10 | 10 |
| | ST amount (parts) | 70 | 70 | 70 | 70 |
| | BA amount (parts) | 30 | 30 | 30 | 30 |
| | LAS Na amount (parts) | 1.0 | 1.0 | 1.0 | 1.0 |
| | PBO amount (parts) | 4.0 | 4.0 | 4.0 | 4.0 |
| Shell portion | MMA amount (parts) | 2.46 | 0.03 | 29.00 | 3.00 |
| | BA amount (parts) | 0.54 | | | |
| | MAA amount (parts) | | | | |
| | ST amount (parts) | | | | |
| | VA-086 | 0.1 | 0.1 | 0.1 | 0.1 |
| | (Meth)acrylate ratio | 100% | 100% | 100% | 100% |
| Particle diameter of non-conductive particle | | 652 nm | 648 nm | 699 nm | 280 nm |
| Binder for porous membrane | (Meth)acrylate ratio | 84% | 84% | 84% | 84% |

TABLE 6

[Results of Example 1 to Example 4]

| | | Ex. 1 | Ex. 2 | Ex. 3 | Ex. 4 |
|---|---|---|---|---|---|
| Non-conductive particle core | Tg | 56° C. | 42° C. | 72° C. | 56° C. |
| Non-conductive particle shell | Tg | 105° C. | 105° C. | 140° C. | 88° C. |
| Non-conductive particle shell | ΔTg | 49° C. | 63° C. | 68° C. | 32° C. |
| Non-conductive particle shell | Thickness ratio | 0.5% | 0.5% | 0.5% | 0.5% |
| Non-conductive particle shell | (Meth)acrylate ratio | 100% | 100% | 60% | 100% |
| Binder for porous membrane | (Meth)acrylate ratio | 84% | 84% | 84% | 84% |
| Non-conductive particles (A) | Number average particle diameter | 650 nm | 651 nm | 651 nm | 653 nm |
| Binder for porous membrane (B) | Number average particle diameter | 370 nm | 370 nm | 370 nm | 370 nm |
| Relationship of average diameters | | (A) > (B) | (A) > (B) | (A) > (B) | (A) > (B) |
| Place for applying porous membrane | Sepa or electrode | Sepa | Sepa | Sepa | Sepa |
| Adhesion test | | A | A | B | A |
| Blocking test | | A | B | A | B |
| Powder falling test | | A | A | A | A |
| Battery rate property | | A | A | A | A |
| Battery cycle property | | A | A | A | A |

TABLE 7

[Results of Example 5 to Example 8]

| | | Ex. 5 | Ex. 6 | Ex. 7 | Ex. 8 |
|---|---|---|---|---|---|
| Non-conductive particle core | Tg | 56° C. | 56° C. | 32° C. | 86° C. |

TABLE 7-continued

[Results of Example 5 to Example 8]

|  |  | Ex. 5 | Ex. 6 | Ex. 7 | Ex. 8 |
|---|---|---|---|---|---|
| Non-conductive particle shell | Tg | 105° C. | 105° C. | 105° C. | 140 C. |
| Non-conductive particle shell | ΔTg | 49° C. | 49° C. | 73° C. | 54° C. |
| Non-conductive particle shell | Thickness ratio | 0.08% | 0.8% | 0.5% | 0.5% |
| Non-conductive particle shell | (Meth)acrylate ratio | 100% | 100% | 100% | 60% |
| Binder for porous membrane | (Meth)acrylate ratio | 84% | 84% | 84% | 84% |
| Non-conductive particles (A) | Number average particle diameter | 648 nm | 650 nm | 651 nm | 650 nm |
| Binder for porous membrane (B) | Number average particle diameter | 370 nm | 370 nm | 370 nm | 370 nm |
| Relationship of average diameters |  | (A) > (B) | (A) > (B) | (A) > (B) | (A) > (B) |
| Place for applying porous membrane | Sepa or electrode | Sepa | Sepa | Sepa | Sepa |
| Adhesion test |  | A | B | A | C |
| Blocking test |  | B | A | C | A |
| Powder falling test |  | A | A | A | A |
| Battery rate property |  | A | A | B | A |
| Battery cycle property |  | A | A | A | B |

TABLE 8

[Results of Example 9 to Example 12]

|  |  | Ex. 9 | Ex. 10 | Ex. 11 | Ex. 12 |
|---|---|---|---|---|---|
| Non-conductive particle core | Tg | 56° C. | 56° C. | 56° C. | 56° C. |
| Non-conductive particle shell | Tg | 68° C. | 105° C. | 105° C. | 100° C. |
| Non-conductive particle shell | ΔTg | 12° C. | 49° C. | 49° C. | 44° C. |
| Non-conductive particle shell | Thickness ratio | 0.5% | 0.02% | 2.8% | 0.5% |
| Non-conductive particle shell | (Meth)acrylate ratio | 100% | 100% | 100% | 0% |
| Binder for porous membrane | (Meth)acrylate ratio | 84% | 84% | 84% | 84% |
| Non-conductive particles (A) | Number average particle diameter | 649 nm | 649 nm | 680 nm | 647 nm |
| Binder for porous membrane (B) | Number average particle diameter | 370 nm | 370 nm | 370 nm | 370 nm |
| Relationship of average diameters |  | (A) > (B) | (A) > (B) | (A) > (B) | (A) > (B) |
| Place for applying porous membrane | Sepa or electrode | Sepa | Sepa | Sepa | Sepa |
| Adhesion test |  | A | A | C | A |
| Blocking test |  | C | C | A | A |
| Powder falling test |  | A | A | A | C |
| Battery rate property |  | A | A | A | B |
| Battery cycle property |  | A | A | B | B |

TABLE 9

[Results of Example 13 to Example 15, Comparative Example 1 and Comparative Example 2]

|  |  | Ex. 13 | Ex. 14 | Ex. 15 | Comp. Ex. 1 | Comp. Ex. 2 |
|---|---|---|---|---|---|---|
| Non-conductive particle core | Tg | 56° C. | 56° C. | 56° C. | 20° C. | 95° C. |
| Non-conductive particle shell | Tg | 105° C. | 105° C. | 105° C. | 105° C. | 140° C. |
| Non-conductive particle shell | ΔTg | 49° C. | 49° C. | 49° C. | 85° C. | 45° C. |

TABLE 9-continued

[Results of Example 13 to Example 15, Comparative Example 1 and Comparative Example 2]

|  |  | Ex. 13 | Ex. 14 | Ex. 15 | Comp. Ex. 1 | Comp. Ex. 2 |
|---|---|---|---|---|---|---|
| Non-conductive particle shell | Thickness ratio | 0.5% | 0.5% | 0.2% | 0.5% | 0.5% |
| Non-conductive particle shell | (Meth)acrylate ratio | 100% | 100% | 100% | 100% | 60% |
| Binder for porous membrane | (Meth)acrylate ratio | 0% | 84% | 84% | 84% | 84% |
| Non-conductive particles (A) | Number average particle diameter | 650 nm | 650 nm | 650 nm | 648 nm | 650 nm |
| Binder for porous membrane (B) | Number average particle diameter | 370 nm | 370 nm | 370 nm | 370 nm | 370 nm |
| Relationship of average diameters |  | (A) > (B) | (A) > (B) | (A) > (B) | (A) > (B) | (A) > (B) |
| Place for applying porous membrane | Sepa or electrode | Sepa | Positive electrode and negative electrode | Sepa | Sepa | Sepa |
| Adhesion test |  | A | A | A | A | D |
| Blocking test |  | A | A | A | D | A |
| Powder falling test |  | C | A | A | A | A |
| Battery rate property |  | B | A | A | D | A |
| Battery cycle property |  | B | A | A | A | D |

TABLE 10

[Results of Comparative Example 3 to Comparative Example 6]

|  |  | Comp. Ex. 3 | Comp. Ex. 4 | Comp. Ex. 5 | Comp. Ex. 6 |
|---|---|---|---|---|---|
| Non-conductive particle core | Tg | 56° C. | 56° C. | 56° C. | 56° C. |
| Non-conductive particle shell | Tg | 62° C. | 105° C. | 105° C. | 105° C. |
| Non-conductive particle shell | ΔTg | 6° C. | 49° C. | 49° C. | 49° C. |
| Non-conductive particle shell | Thickness ratio | 0.5% | 0.005% | 4.0% | 0.5% |
| Non-conductive particle shell | (Meth)acrylate ratio | 100% | 100% | 100% | 100% |
| Binder for porous membrane | (Meth)acrylate ratio | 84% | 84% | 84% | 84% |
| Non-conductive particles (A) | Number average particle diameter | 652 nm | 648 nm | 699 nm | 280 nm |
| Binder for porous membrane (B) | Number average particle diameter | 370 nm | 370 nm | 370 nm | 370 nm |
| Relationship of average diameters |  | (A) > (B) | (A) > (B) | (A) > (B) | (A) < (B) |
| Place for applying porous membrane | Sepa or electrode | Sepa | Sepa | Sepa | Sepa |
| Adhesion test |  | A | A | D | A |
| Blocking test |  | D | D | A | D |
| Powder falling test |  | A | A | A | C |
| Battery rate property |  | A | A | A | A |
| Battery cycle property |  | A | A | C | A |

DISCUSSION

As seen from the Tables, favorable results are obtained in Examples regarding all of adhesion test, blocking test, and powder falling test. From these results, it was confirmed that the present invention can realize a porous membrane for a secondary battery having high adhesion property and anti-blocking property, and low tendency to cause powder falling. Further, it was also confirmed that the secondary battery having the porous membrane for a secondary battery has excellent rate property and cycle property.

The invention claimed is:

1. A porous membrane for a secondary battery, comprising non-conductive particles and a binder for a porous membrane, wherein
the non-conductive particle is a polymer particle having a core-shell structure,
the non-conductive particle has a core portion having a glass transition point of 30° C. to 90° C.,
the non-conductive particle has a shell portion having a glass transition point higher than that of the core portion by 10° C. or higher, a thickness of the shell portion is 0.01% to 3.0% of a number average particle diameter of the non-conductive particles, and a number average particle diameter (A) of the non-conductive particle and a number average particle diameter (B) of the binder for a porous membrane satisfy (A)>(B).

2. The porous membrane for a secondary battery according to claim 1, wherein the shell portion of the non-conductive particles and the binder for a porous membrane contain 50% by weight or more of (meth)acrylate unit.

3. The porous membrane for a secondary battery according to claim 1, wherein the non-conductive particles have a number average particle diameter of 100 nm to 1,500 nm.

4. A method for producing the porous membrane for a secondary battery according to claim 1, comprising:
mixing the non-conductive particles, the binder for a porous membrane, and a medium to prepare a slurry for a porous membrane;
applying the slurry for a porous membrane onto a substrate to form a slurry layer; and
drying the slurry layer.

5. The method according to claim 4, wherein
the medium is an aqueous medium, and
the slurry for a porous membrane is an aqueous dispersion.

6. An electrode for a secondary battery, comprising:
a current collector;
an electrode material layer that contains an electrode active material and a binding agent for an electrode material layer, and adheres to the current collector, and
the porous membrane according to claim 1 that is formed on the electrode material layer.

7. A separator for a secondary battery, comprising:
an organic separator; and
the porous membrane according to claim 1 that is formed on the organic separator.

8. A secondary battery comprising a positive electrode, a negative electrode, a separator, and an electrolytic solution, wherein
at least any one of the positive electrode, the negative electrode, and the separator has the porous membrane according to claim 1.

* * * * *